United States Patent [19]
Yamada

[11] Patent Number: 6,134,123
[45] Date of Patent: Oct. 17, 2000

[54] SWITCH-MODE DC POWER SUPPLY, MONOLITHIC IC AND HYBRID IC FOR THE SAME

[75] Inventor: Tomoyasu Yamada, Niiza, Japan

[73] Assignee: Sanken Electric Co., Ltd., Japan

[21] Appl. No.: 09/455,285

[22] Filed: Dec. 6, 1999

[51] Int. Cl.⁷ .......................... H02M 3/335; H02M 3/24
[52] U.S. Cl. ............................................. 363/21; 363/97
[58] Field of Search ............................... 363/20, 21, 95, 363/97, 131

[56] References Cited

U.S. PATENT DOCUMENTS

| | | | |
|---|---|---|---|
| 4,764,856 | 8/1988 | Rausch | 363/21 |
| 5,012,401 | 4/1991 | Barlage | 363/97 |
| 5,717,578 | 2/1998 | Afzal | 363/21 |
| 5,901,051 | 5/1999 | Takahashi et al. | 363/21 |

*Primary Examiner*—Matthew Nguyen
*Attorney, Agent, or Firm*—Jones & Askew

[57] ABSTRACT

The switch-mode dc power supply includes a series circuit, a rectifier, an output smoothing circuit, detection circuit, an adding circuit, a triangular wave generator and a control signal generator. The series circuit includes a primary winding of a HF transformer, a semiconductor switching element and a current detection unit connected between two output terminals of a rectifier/smoothing circuit. The rectifier is connected to an end of a secondary winding of the HF transformer. The output smoothing circuit is connected between the rectifier and other end of the secondary winding. The detection circuit is connected to a connection point between the rectifier and the output smoothing circuit. The adding circuit is connected between the detection circuit and a connection point between the semiconductor switching element and the current detection unit. The adding circuit has a current mirror and a current detector. The triangular wave generator is connected to the adding circuit. And the control signal generator is connected between the adding circuit and a control electrode of the semiconductor switching element, and further is connected to the triangular wave generator. The adding circuit adds a voltage corresponding to a dc output signal at the secondary winding to a voltage corresponding to a current flowing in the semiconductor switching element so as to obtain an augmented voltage signal. The gate electrode is supplied with a drive signal keeping the "H" level until the augmented voltage signal reaches the triangular wave signal. Then, the power supply operates with good stability.

20 Claims, 13 Drawing Sheets

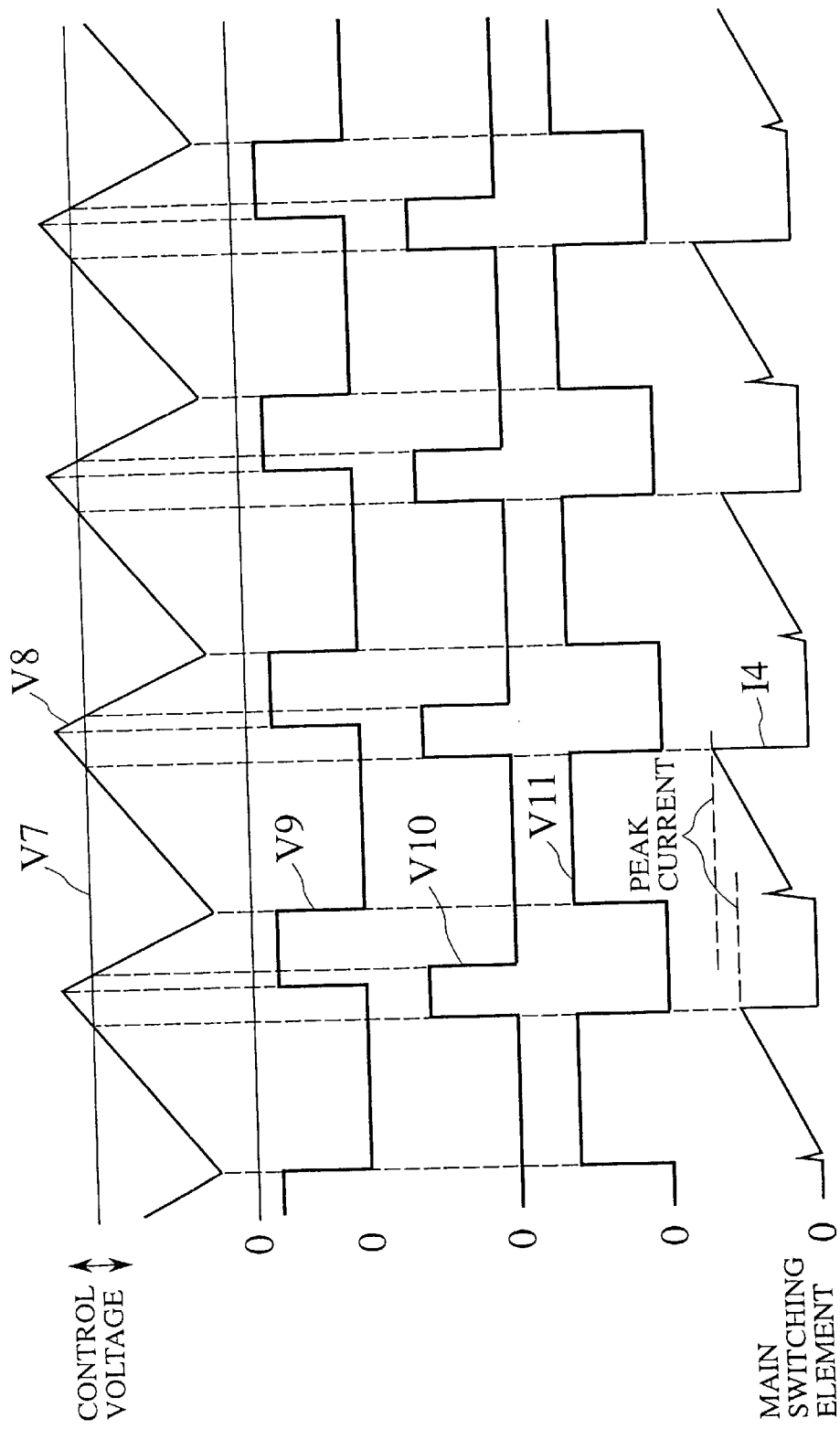

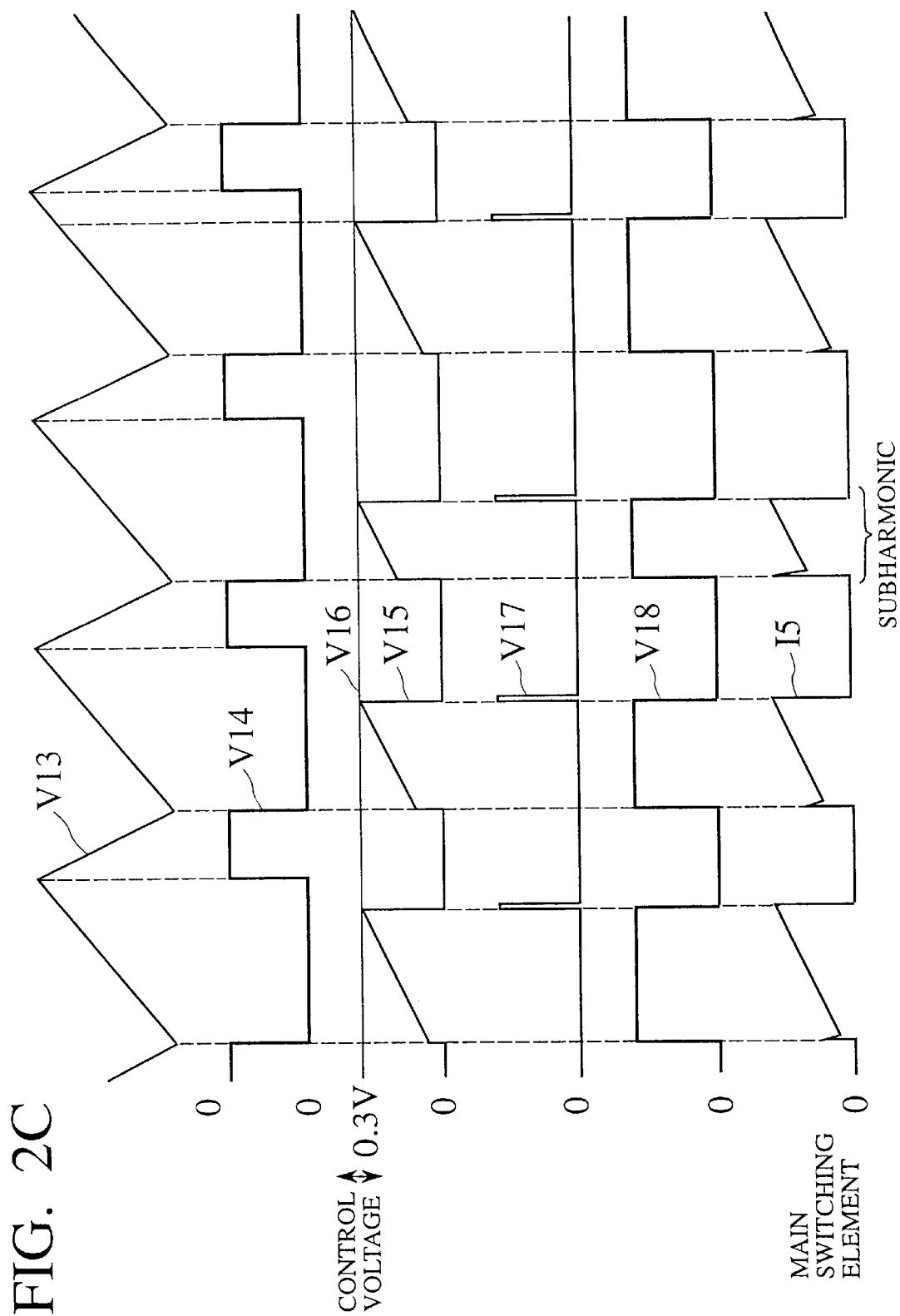

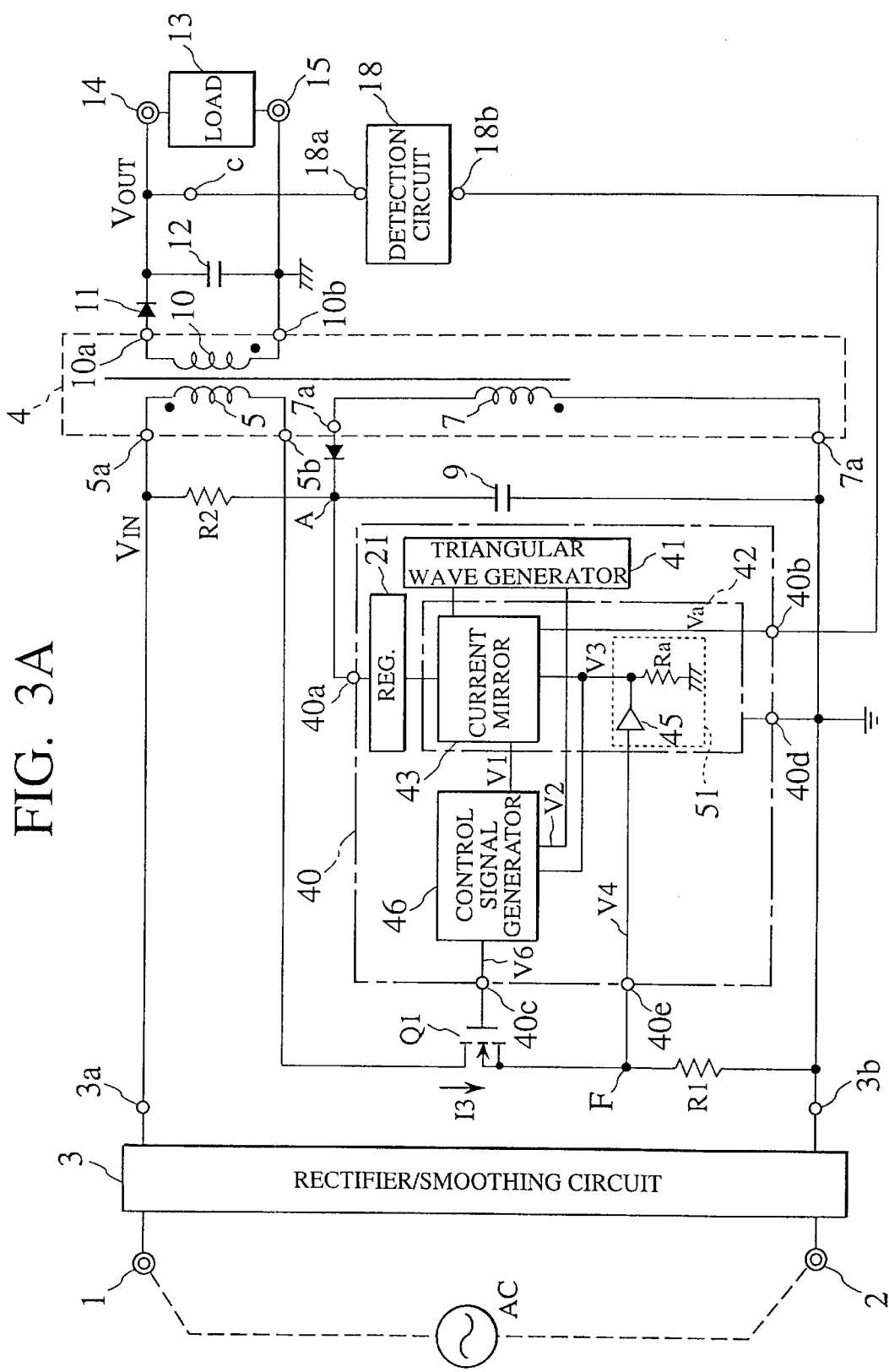

SWITCH-MODE DC POWER SUPPLY, MONOLITHIC IC AND HYBRID IC FOR THE SAME

BACKGROUND OF THE INVENTION

1. Field of the Invention

The present invention relates to a regulated dc power supply, and more particularly to a switch-mode dc power supply (switching dc power supply) having a control circuit merging in a semiconductor chip so as to form a monolithic integrated circuit (IC), which is highly stable both at light and heavy loads, and a hybrid IC mounting the monolithic IC chip and a semiconductor switching element chip on a same substrate.

2. Description of the Related Art

Traditionally, linear power supplies have been used. However, advances in semiconductor technology have lead to switch-mode dc power supplies, which are smaller and much more efficient compared to linear power supplies. Generally, the switch-mode dc power supply employs a pulse width modulation (PWM) strategy, and a semiconductor switching element is connected to a primary winding of a high-frequency isolation transformer (hereinafter called "the HF transformer"). And an unregulated dc voltage is supplied to the primary winding of the HF transformer. The unregulated dc voltage is converted into an ac voltage by turning the semiconductor switching element fully on or fully off. And the ac voltage at the secondary side of the HF transformer is rectified and smoothed on a secondary side of the HF transformer. The output dc voltage at the secondary side of the HF transformer is regulated by means of feedback control that employs a PWM controller. Then, the obtained regulated dc voltage is applied to the output load.

The dc voltage at secondary side of the switch-mode dc power supply fluctuates continuously in accordance with the load state. For instance, when the load is heavy, the secondary side dc voltage falls with respect to the rated output voltage, and when the load is light, the secondary side dc voltage rises. For this reason, the ON/OFF periods of the semiconductor switching element are controlled by using a negative-feedback control system, while detecting the state of the secondary side dc voltage, so that the rated output voltage is always obtained on the secondary side of the HF transformer. That is, when the load is heavy, the ON state pulse width (hereinafter called "the pulse duration") of the current flowing through the semiconductor switching element is widened to increase the amount of current induced at the secondary side of the HF transformer so as to raise the dc voltage nearer to the rated voltage. On the contrary, when the load is light, the pulse duration of the current flowing through the semiconductor switching element is made narrower to reduce the amount of current induced at the secondary side of the HF transformer, so as to reduce the dc voltage nearer to the rated output voltage. And thereby, the stable and constant dc voltage is implemented.

FIG. 1A is a schematic configuration of a switch-mode dc power supply according to a voltage-mode control scheme. As shown in FIG. 1A, the switch-mode dc power supply in the voltage-mode control scheme has a rectifier/smoothing circuit 3. The input terminals 1 and 2 of the rectifier/smoothing circuit 3 are connected to a commercial ac power line. A first series circuit 6 has a primary winding 5 of a HF transformer 4 and a MOS transistor Q1, and is connected between the output terminals 3a and 3b of the rectifier/smoothing circuit 3. Furthermore, the HF transformer 4 has an auxiliary winding 7, which is connected to a diode 8 and a capacitor 9. A power for driving a control circuit explained later is obtained at the connection point A of the capacitor 9 and the cathode terminals of the diode 8. Furthermore, one end of a resistor R2 connects to the connection point A, and the other end of the resistor R2 connects to the end 5a of the primary winding 5 of the HF transformer 4.

On the secondary side of the HF transformer 4, a diode 11 and a capacitor 12 are connected to a secondary winding 10 of the HF transformer 4. And one terminal 14 of a load 13 is connected to the connection point of the cathode terminals of the diode 11 and the capacitor 12. A detection point C is provided at the connection point on the secondary side of the HF transformer 4. And a detection circuit 18 is provided for detecting dc voltage obtained on the secondary side of the HF transformer 4 from this detection point C via an input terminal 18a.

Moreover, a control circuit 20 is provided on the primary side of the HF transformer 4 to generate a triangular reference voltage so as to output a control signal of a predetermined duty ratio (hereinafter called "drive signal"). The drive signal is fed to a gate electrode G of a power MOS FET (hereinafter called simply "MOStransistor Q1") based on the voltage detected by the detection circuit 18, and thereby driving the MOStransistor Q1 between the ON and OFF states.

The control circuit 20 has an input terminal 20a which receives a driving power from the connection point A, an input terminal 20b connected to the output terminal 18b of the detection circuit 18, an output terminal 20c and an output terminal 20d. The output terminal 20c sends the drive signal to the gate electrode G of the MOS transistor Q1. And the output terminal 20d is jointly connected to the source electrode S of the MOS transistor Q1, the other end of the capacitor 9, the other end 7b of the auxiliary winding 7, the other output terminal 3b of the rectifier/smoothing circuit 3, and ground.

As shown in FIG. 1B, the control circuit 20 has a regulator 21, an oscillator (OSC) 22, and resistors R3 and R4 for dividing the reference voltage from the regulator 21 and obtaining a control voltage V7 at a voltage-division point B. The regulator 21 generates a regulated reference voltage using the driving power from the input terminal 20a. The oscillator (OSC) 22 outputs a triangular reference voltage V8 and a rectangular pulse wave V9 (hereinafter called "the rectangular synchronizing pulse signal V9). The triangular reference voltage V8 has a triangular waveform, repeating a pattern of rising linearly with time from the lowest to the highest voltage, and then falling linearly with time to the lowest voltage. And the rectangular synchronizing pulse signal V9 has a rectangular waveform for determining dead time of a driver (explained later) in synchronism with the triangular reference voltage V8.

The control circuit 20 further has a comparator 23, a flip-flop 24, a NOR gate 25 and a driver 26. The comparator 23 outputs a signal V10 based on a comparison of the control voltage V7 and the triangular reference voltage V8 from the oscillator 22. The flip-flop 24 inputs the signal V10 from the comparator 23 to a reset terminal R (hereinafter called "R terminal"), and input the rectangular synchronizing pulse signal V9 from the oscillator 22 to a set terminal S (hereinafter called "S terminal"). Similarly, and obtains a logical output signal of these at an output terminal, or a "Q-bar" terminal. The NOR gate 25 receives the rectangular synchronizing pulse signal V9 and the logical output signal from the flip-flop 24, and outputs a logical NOR of these. The driver 26 outputs to the gate electrode G a drive signal V11 for driving the MOS transistor Q1, based on the logical NOR from the NOR gate 25.

On the other hand, as shown in FIG. 1B, the detection circuit 18 has resistors R5 and R6 and a differential amplifier 28. Through the resistors R5 and R6, the dc voltage at the detection point C in the secondary side of the HF transformer 4 is obtained at a voltage-division point D. And the output level of the differential amplifier 28 controls an optical coupler 29, based on the difference between the dc voltage at the voltage-division point D and a reference voltage 27. Furthermore, the collector electrode of a phototransistor in the optical coupler 29 is connected via the input terminal 20b of the control circuit 20 to the voltage-division point B between the resistors R3 and R4.

That is, the dc voltage Vout at the detection point C on the secondary side of the HF transformer 4 is detected, and is inputted to the detection circuit 18 as a feedback signal. And, the detection circuit 18 adjusts the control voltage V7 depending on the difference between the voltage level of this feedback signal and the reference voltage 27.

FIG. 1C is a timing chart explaining the operation of the switch-mode dc power supply by the voltage-mode control scheme. When the input terminals 1 and 2 are connected to the commercial ac power line, the rectifier/smoothing circuit 3 rectifies and smoothes the ac current. Then, the dc current obtained by the rectifier/smoothing circuit 3 is applied to a second series circuit, including the resistor R2 and the capacitor 9, and a control power at a predetermined voltage is obtained at the connection point A. The control power is supplied to the control circuit 20 via the input terminal 20a. When the control power is supplied, the control circuit 20 commences operation, and generates a sequence of pulses to the primary winding 5 of the HF transformer 4 by turning MOStransistor Q1 on and off. In addition, the control circuit 20 induces another sequence of pulses in the secondary winding 10 of the HF transformer 4 based on the winding turns ratio of the two windings, thereby obtaining a rectified and smoothed dc voltage from the diode 11 and the capacitor 12.

The regulator 21 of the control circuit 20 obtains a predetermined dc voltage from the power supply for driving, and supplies it to a first series circuit including the oscillator 22 and the resistors R3 and R4. When the oscillator 22 receives the dc voltage, it sends the triangular reference voltage V8 at a predetermined frequency, as shown in FIG. 1C, to the comparator 23. And the oscillator 22 outputs the rectangular synchronizing pulse signal V9 in order to determine a dead time for the driver 26 in synchronism with the triangular reference voltage V8.

The rectangular synchronizing pulse signal V9 holds the "H" level while the triangular reference voltage V8 is decreasing from the maximum value to the minimum value. Furthermore, the potential level of the control voltage V7 at the voltage-division point B fluctuates (when the load is heavy or light) depending on the voltage detected by the detection circuit 18.

The comparator 23 compares the potential levels of the control voltage V7 and the triangular reference voltage V8, and transmits an output signal V10 to the R terminal of the flip-flop 24. The output signal V10 keeps the "H" level during the period in which the potential level of the triangular reference voltage V8 is exceeding the potential level of the control voltage V7.

As a consequence, when the rectangular synchronizing pulse signal V9 and the output signal V10 are at the "L" level, the flip-flop 24 outputs a signal (not shown) from the "Q-bar" terminal at the "H" level. And, when the rectangular synchronizing pulse signal V9 is at the "L" level and the output signal V10 is at the "H" level, the flip-flop 24 outputs an L-level output signal at the "Q-bar" terminal. Furthermore, when the rectangular synchronizing pulse signal V9 is at the "H" level and the output signal V10 is at the "H" level, an "H" level signal is outputted from the "Q-bar" terminal.

The signal output from the flip-flop 24 is inverted by the NOR gate 25 to generate an inverted signal (not shown), which is sent to the driver 26. When the driver 26 receives the signal from the NOR gate 25, it transmits the drive signal V11 shown in FIG. 1C to the gate electrode G of the MOS transistor Q1.

As shown in FIG. 1C, the drive signal V11 is the "H" level, when the triangular reference voltage V8 is at the lowest value. And the drive signal V11 keeps the "H" level, when the potential level of the triangular reference voltage V8 is increasing from the lowest value to reach the potential level of the control voltage V7. And the drive signal V11 becomes the "L" level, when the dc voltage of the secondary side of the HF transformer 4 exceeds the reference voltage 27 so that the output signal V10 from the comparator 23 raise to the "H" level. In this way, the drive signal V11 repeatedly switches between the "H" level and the "L" level.

The MOS transistor Q1 performs the switching operation with the charge and discharge of gate input capacitance. And the pulse duration of the drive signal V11 for driving the MOS transistor Q1 is controlled by the comparison of the potential levels of the triangular reference voltage V8 and the control voltage V7. Hence, the current I4 flowing through MOS transistor Q1 manifests a stable current waveform I4 with light load as shown in FIG. 1C.

However, with heavy load, since the pulse duration of the drive signal V11 is determined by comparing the triangular reference voltage V8 and the control voltage V7, the peak current I4 flowing through MOS transistor Q1 becomes greater than that for light load. In such a state, an oscillation shown in FIG. 1C is especially liable to occur. And there have been many cases when this oscillation state continues across two or more cycles, influencing the secondary side dc voltage, which forms the waveform of the output power, and resulting in unstable operation. In such a case, the phase must be corrected in the control circuit.

Like this way, even when the input/output state of the switch-mode power supply is not fluctuating, in the voltage-mode control scheme, an oscillation having different current peaks for each cycles is likely to occur in the current I4 flowing through the MOS transistor Q1, as shown in FIG. 1C. This is because the voltage-mode control scheme regulates the current flowing through MOS transistor Q1 by adjusting the ON period of the MOS transistor Q1, based on the comparison between the control voltage V7 and the triangular waveform voltage V8, and thereby controls the output voltage. Here, the control voltage V7 is the feedback voltage signal obtained on the secondary side of the HF transformer 4. When such oscillation occurs, it is necessary to correct the phase of the control circuit, but there is a problem that it takes time to investigate, consider or redesign the circuit for correcting the phase. Furthermore, even when an enough time has been wasted for the countermeasure against the oscillation, it is not always possible to correct the phase completely.

SUMMARY OF THE INVENTION

The present invention has been made in light of the above problems and it is an object of the present invention to provide a switch-mode dc power supply, which can suppress the oscillation with a simple circuit configuration, without wasting time.

Another object of the present invention is to provide a switch-mode dc power supply having good stabilities for both light and heavy load conditions.

Still another object of the present invention is to provide a switch-mode dc power supply having high noise immunity.

Still another object of the present invention is to provide a switch-mode dc power supply, which can operate with lower power dissipation so as to improve the power conversion efficiency.

Still another object of the present invention is to provide a switch-mode dc power supply operating stably even with the heavy load such that continuous inductor current is flowing in the semiconductor switching element.

Still another object of the present invention is to provide a switch-mode dc power supply, which can suppress "a subharmonic oscillation phenomenon (which will explained later)" with a simple configuration, without providing a special circuit, even with higher duty ratio exceeding 50% for the driving pulse of the semiconductor switching element.

Still another object of the present invention is to provide a monolithic IC merging a control circuit for a switch-mode dc power supply, which can suppress the oscillation with a simple circuit configuration, without wasting time.

Still another object of the present invention is to provide a monolithic IC merging a control circuit for a switch-mode dc power supply having good stabilities for both light and heavy load conditions.

Still another object of the present invention is to provide a monolithic IC merging a control circuit for a switch-mode dc power supply having high noise immunity.

Still another object of the present invention is to provide a monolithic IC merging a control circuit for a switch-mode dc power supply, which can operate with lower power dissipation, improving the power conversion efficiency.

Still another object of the present invention is to provide a monolithic IC, merging a control circuit for a switch-mode dc power supply, operating stably even with the heavy load such that continuous inductor current is flowing in the semiconductor switching element.

Still another object of the present invention is to provide a monolithic IC merging a control circuit for a switch-mode dc power supply, which can suppress the subharmonic oscillation phenomenon with a simple circuit configuration even with higher duty ratio exceeding 50% for the driving pulse of the semiconductor switching element.

Still another object of the present invention is to provide a hybrid IC for the switch-mode dc power supply, mounting a semiconductor switching element and a monolithic IC for controlling the semiconductor switching element, which can suppress the oscillation with a simple circuit configuration, without wasting time.

Still another object of the present invention is to provide a hybrid IC for the switch-mode dc power supply, mounting a semiconductor switching element and a monolithic IC for controlling the semiconductor switching element, the power supply having good stabilities for both light and heavy load conditions.

Still another object of the present invention is to provide a hybrid IC for the switch-mode dc power supply, mounting a semiconductor switching element and a monolithic IC for controlling the semiconductor switching element, the power supply having high noise immunity.

Still another object of the present invention is to provide a hybrid IC for the switch-mode dc power supply, mounting a semiconductor switching element and a monolithic IC for controlling the semiconductor switching element, the power supply can operate with lower power dissipation so as to improve the power conversion efficiency.

Still another object of the present invention is to provide a hybrid IC for the switch-mode dc power supply, mounting a semiconductor switching element and a monolithic IC for controlling the semiconductor switching element, the power supply operates stably even with the heavy load such that continuous inductor current is flowing in the semiconductor switching element.

Still another object of the present invention is to provide a hybrid IC for the switch-mode dc power supply, mounting a semiconductor switching element and a monolithic IC for controlling the semiconductor switching element, the power supply can suppress the subharmonic oscillation phenomenon even with higher duty ratio exceeding 50% for the driving pulse of the semiconductor switching element.

In order to achieve the above objects, a first feature of the present invention inheres in a switch-mode dc power supply including a series circuit, a rectifier, an output smoothing circuit, detection circuit, an adding circuit, a triangular wave generator and a control signal generator. Here, the series circuit includes a primary winding of a HF transformer, a semiconductor switching element and a current detection unit connected between two output terminals of a rectifier/smoothing circuit. The rectifier is connected to an end of a secondary winding of the HF transformer. The output smoothing circuit is connected between the rectifier and other end of the secondary winding of the HF transformer. The detection circuit is connected to a connection point between the rectifier and the output smoothing circuit. The adding circuit is connected between the detection circuit and a connection point between the semiconductor switching element and the current detection unit. The triangular wave generator is connected to the adding circuit. And the control signal generator is connected between the adding circuit and a control electrode of the semiconductor switching element, and further is connected to the triangular wave generator.

In the first feature of the present invention, the detection circuit obtains a signal in correspondence with a voltage output from the output smoothing circuit. The adding circuit executes the adding function based upon a signal from the current detector and a signal from the connection point between the semiconductor switching element and the current detection unit. The triangular wave generator provides a periodic triangular reference voltage. And the control signal generator provides a control signal so that the semiconductor switching element turns on in synchronism with the rise or fall of the triangular reference voltage. Further, the control signal generator provides the control signal so that the semiconductor switching element can turn off in synchronism with a result of the comparison between the voltage obtained from the adding circuit and the triangular reference voltage obtained from the triangular wave generator.

According to the first feature of the present invention, the augmented voltage signal is obtained by adding an extra voltage value, corresponding to a dc voltage on the secondary side of the HF transformer, to a voltage corresponding to a current flowing through the semiconductor switching element connected to the primary winding. And the semiconductor switching element can turns on in synchronism with the rise or fall of the triangular reference voltage. And in addition, the semiconductor switching element is controlled by the control signal to be turned off in synchronism with the output, generated according to the result of the comparison between the augmented voltage signal and the triangular reference voltage. Consequently, with light load, since the comparison is conducted with the augmented voltage signal having a higher level than the triangular reference voltage and ground, the operation is stable and there is little influence of noise. Namely, in the operation with the light load, the speed of the augmented voltage signal to reach the potential level of triangular reference voltage is increased so as to reduce the peak value of the current flowing through the semiconductor switching element.

Furthermore, with heavy load, even under conditions where "the subharmonic oscillation phenomenon" is liable to occur, the stable operation can be achieved with a simple configuration without providing a special circuit for preventing "the subharmonic oscillation phenomenon". This is because the augmented voltage signal is compared directly with the potential level on the slope of the triangular reference voltage. That is, with heavy load, the dc component in the augmented voltage signal is reduced so that the time required for the augmented voltage signal to reach the triangular reference voltage increase. Then the peak value of the current flowing through the semiconductor switching element can be increased stably.

A second feature of the present invention inheres in a monolithic IC for a switch-mode dc power supply explained in the first feature. The monolithic IC of the second feature comprises a semiconductor chip; first, second, third input terminals and first and second output terminals disposed at periphery of the semiconductor chip; a regulator connected to the first input terminal; an adding circuit connected to the regulator, the second and third input terminals; a triangular wave generator connected to the adding circuit; and a control signal generator connected between the adding circuit and the first output terminal, and further connected to the triangular wave generator. Each of the first, second and third input terminals and the first and second output terminals comprises a thin metallic film so as to form a bonding pad. It is of course that the regulator, the adding circuit, the triangular wave generator, and the control signal generator are merged on a surface of the semiconductor chip.

In the second feature of the present invention, the adding circuit executes the adding function based upon a signal from the second and third input terminals. The triangular wave generator provides a periodic triangular reference voltage. And the control signal generator provides a control signal from the first output terminal so that a semiconductor switching element in the switch-mode dc power supply turns on in synchronism with the rise or fall of the triangular reference voltage. Further, the control signal generator provides the control signal so that the semiconductor switching element can turn off in synchronism with a result of the comparison between the voltage obtained from the adding circuit and the triangular reference voltage obtained from the triangular wave generator.

According to the second feature of the present invention, an augmented voltage signal is obtained by adding an extra voltage value, corresponding to a dc voltage on a secondary side of the HF transformer in the switch-mode dc power supply to a voltage corresponding to a current flowing through the semiconductor switching element connected to a primary winding of the HF transformer. And the semiconductor switching element can turns on in synchronism with the rise or fall of the triangular reference voltage. And in addition, the semiconductor switching element is controlled by the control signal to be turned off in synchronism with the output, generated according to the result of the comparison between the augmented voltage signal and the triangular reference voltage. Consequently, with light load, since the comparison is conducted with the augmented voltage signal having a higher level than the triangular reference voltage and ground, the operation is stable and there is little influence of noise. Namely, in the operation with the light load, the speed of the augmented voltage signal to reach the potential level of triangular reference voltage is increased so as to reduce the peak value of the current flowing through the semiconductor switching element. Furthermore, with heavy load, the stable operation can be achieved, preventing "the subharmonic oscillation phenomenon". This is because the augmented voltage signal is compared directly with the potential level on the slope of the triangular reference voltage. That is, with heavy load, the dc component in the augmented voltage signal is reduced so that the time required for the augmented voltage signal to reach the triangular reference voltage increase. Then the peak value of the current flowing through the semiconductor switching element can be increased stably.

A third feature of the present invention inheres in a hybrid IC for a switch-mode dc power supply explained in the first feature. The hybrid IC of the third feature comprises a conductive base substrate; an insulating plate disposed on a part of the conductive base substrate; a first semiconductor chip disposed on another part of the conductive base substrate, the first semiconductor chip merging a semiconductor switching element; and a second semiconductor chip disposed on the insulating plate, the second semiconductor chip is the monolithic IC explained in the second feature.

According to the third feature of the present invention, an augmented voltage signal is obtained in the monolithic IC. And the semiconductor switching element can turns on in synchronism with the rise or fall of the triangular reference voltage generated by the monolithic IC. And in addition, the semiconductor switching element is controlled by the control signal from the monolithic IC. In the operation of the switch-mode dc power supply with the light load, the speed of the augmented voltage signal to reach the potential level of the triangular reference voltage generated in the monolithic IC is increased so as to reduce the peak value of the current flowing through the semiconductor switching element. Furthermore, with heavy load, the stable operation can be achieved, preventing "the subharmonic oscillation phenomenon". This is because the augmented voltage signal is compared directly with the potential level on the slope of the triangular reference voltage. That is, with heavy load, the dc component in the augmented voltage signal is reduced so that the time required for the augmented voltage signal to reach the triangular reference voltage increase. Then the peak value of the current flowing through the semiconductor switching element can be increased stably.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the present invention in practice.

BRIEF DESCRIPTION OF THE DRAWINGS

FIG. 1C is a timing chart explaining the operation of the switch-mode dc power supply shown in FIG. 1A;

FIG. 2C is a timing chart explaining the operation of the switch-mode dc power supply shown in FIG. 2A;

FIG. 3A is a schematic configuration of a switch-mode dc power supply according to a first embodiment of the present invention;

DESCRIPTION OF THE PREFERRED EMBODIMENTS

Figure 1A:
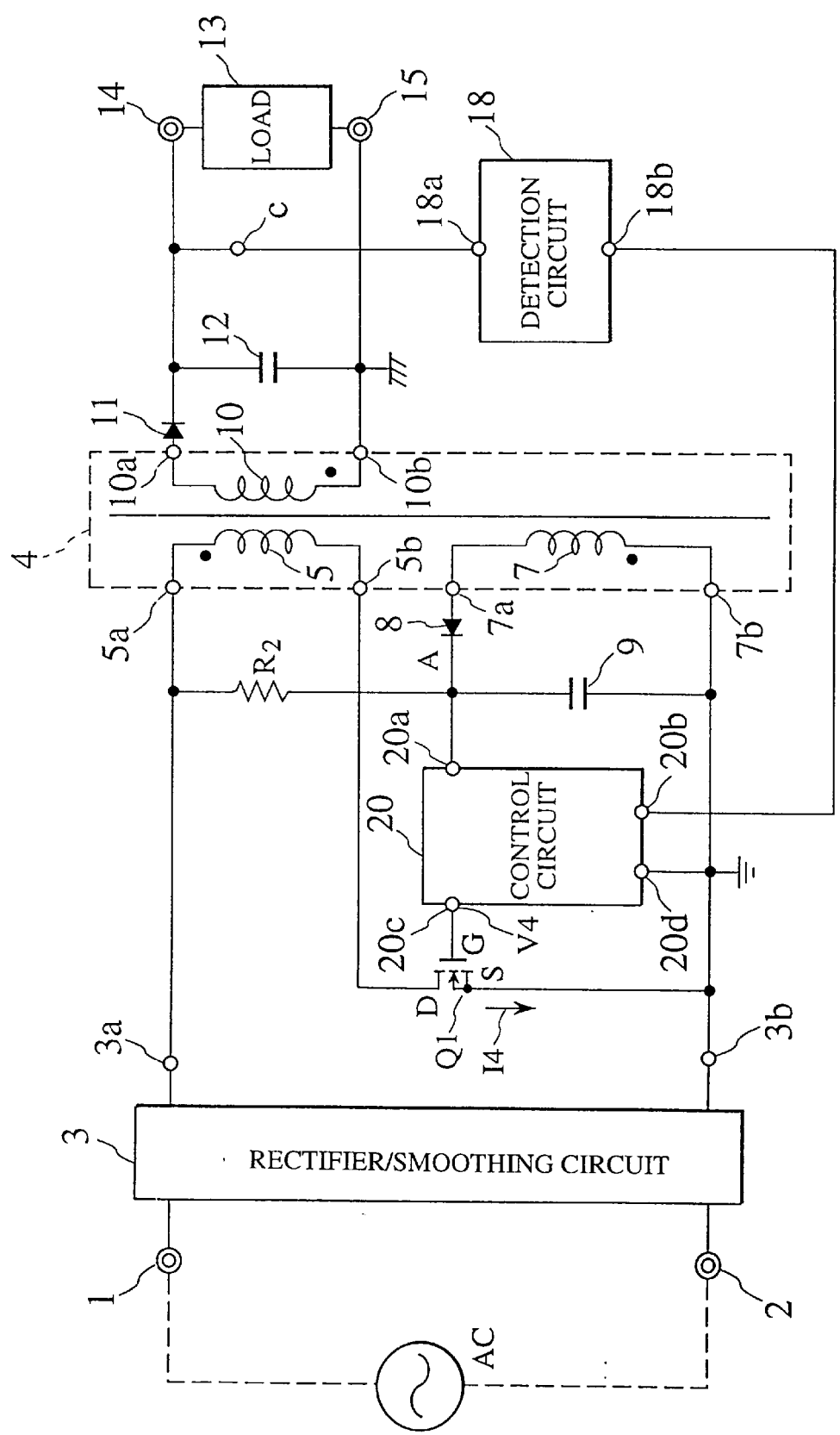
FIG. 1A is a schematic configuration of a switch-mode dc power supply of a voltage-mode control scheme according to an illustrative example of the present invention.

Various embodiments as well as a comparative example of the present invention will be described with reference to the accompanying drawings. It is to be noted that the same or similar reference numerals are applied to the same or similar parts and elements throughout the drawings, and the description of the same or similar parts and elements will be omitted or simplified.

In the following description specific details are set fourth, such as specific circuit configurations and equipment in order to provide thorough understanding of the present invention. It will be apparent, however, to one skilled in the art that the present invention may be practised without these specific details. In other instances, well-known specific circuit configurations and equipment are not set fourth in detail in order not unnecessary obscure the present invention.

COMPARATIVE EXAMPLE

Figure 2A:
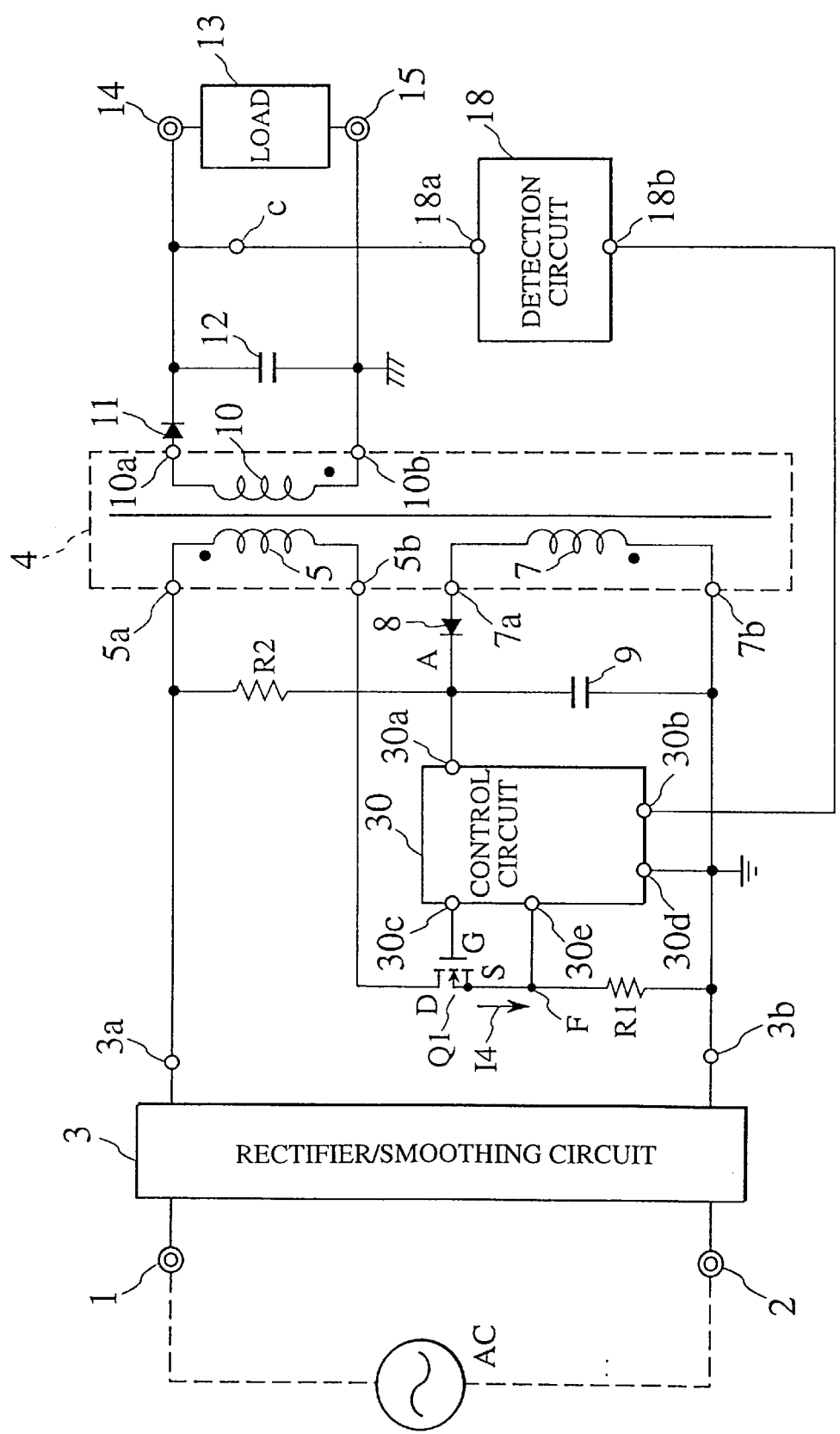
FIG. 2A is a schematic configuration of a switch-mode dc power supply of a current-mode control according to a comparative example of the present invention.

Next, a switch-mode dc power supply according to a current-mode control scheme will be explained as the comparative example of the present invention. As shown in FIG. 2A, in the configuration of the switch-mode dc power supply of the current-mode control scheme, one end of a resistor R1 is connected to the source electrode S of the semiconductor switching element Q1. And in addition, the input terminal 30e of a control circuit 30, which will be explained below, is connected at a connection point F between the source electrode S of the semiconductor switching element Q1 and the resistor R1. Furthermore, the other end of the resistor R1 is jointly connected to the output terminal 3b of the rectifier/smoothing circuit 3.

Figure 2B:
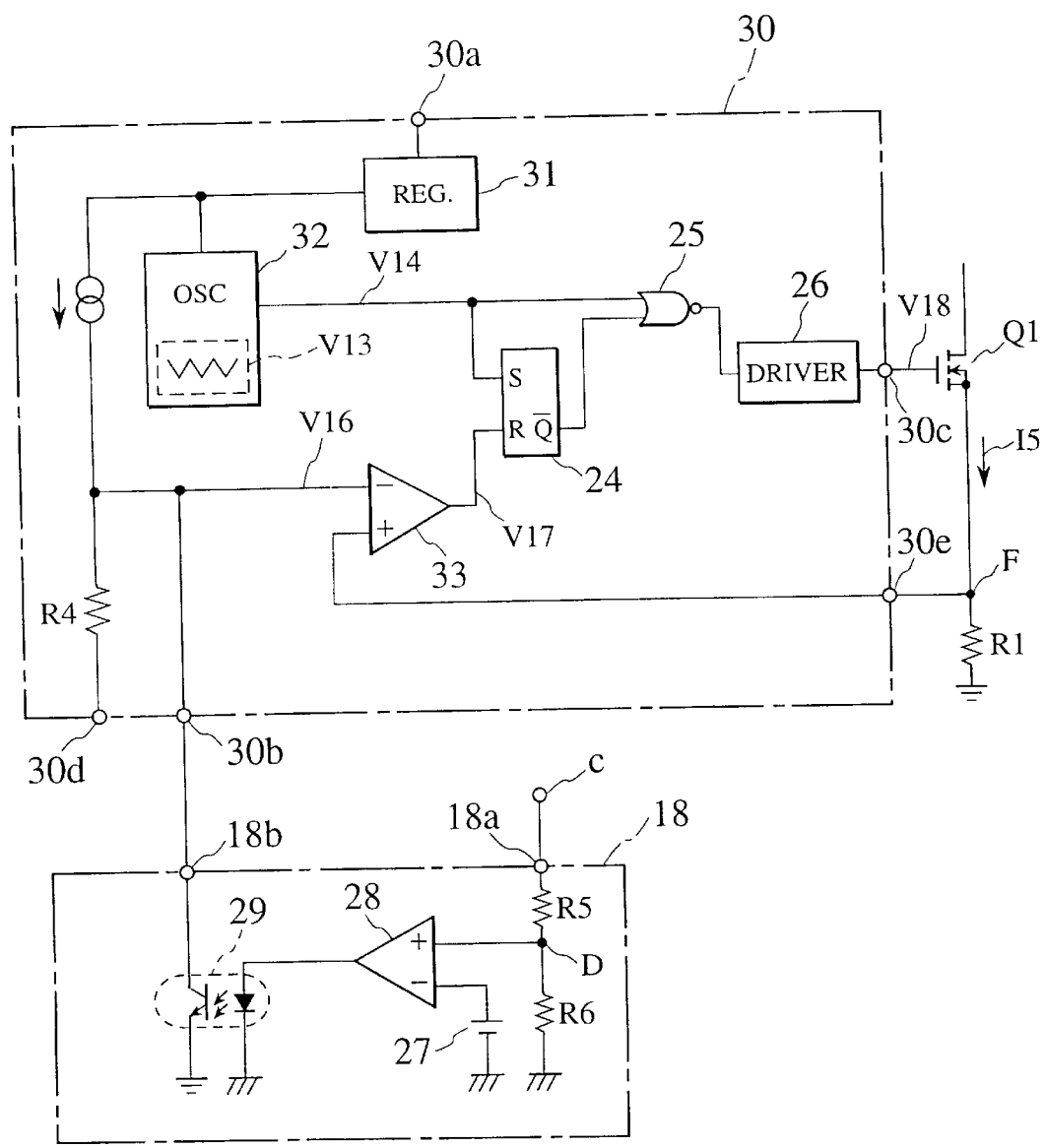
FIG. 2B is a detailed configuration of a control circuit of the switch-mode dc power supply shown in FIG. 2A.

That is, a series circuit (hereinafter called "the first series circuit") has the primary winding 5 of the HF transformer 4, the semiconductor switching element Q1, and the resistor R1. The first series circuit is connected between the output terminals 3a and 3b of the rectifier/smoothing circuit 3. As shown in FIG. 2B, an output terminal 30c of the control circuit 30 connects to the gate electrode G of the semiconductor switching element Q1. And an output terminal 30d connects to the output terminal 3b of the rectifier/smoothing circuit 3, an input terminal 30e connects to the connection point F of the first series circuit, and an input terminal 30b connects to a detection circuit 18, which will be described later. Furthermore, an input terminal 30a connects to a connection point A between a resistor R2 and a capacitor 9. The resistor R2 and the capacitor 9 constitute a second series circuit.

Figure 1B:
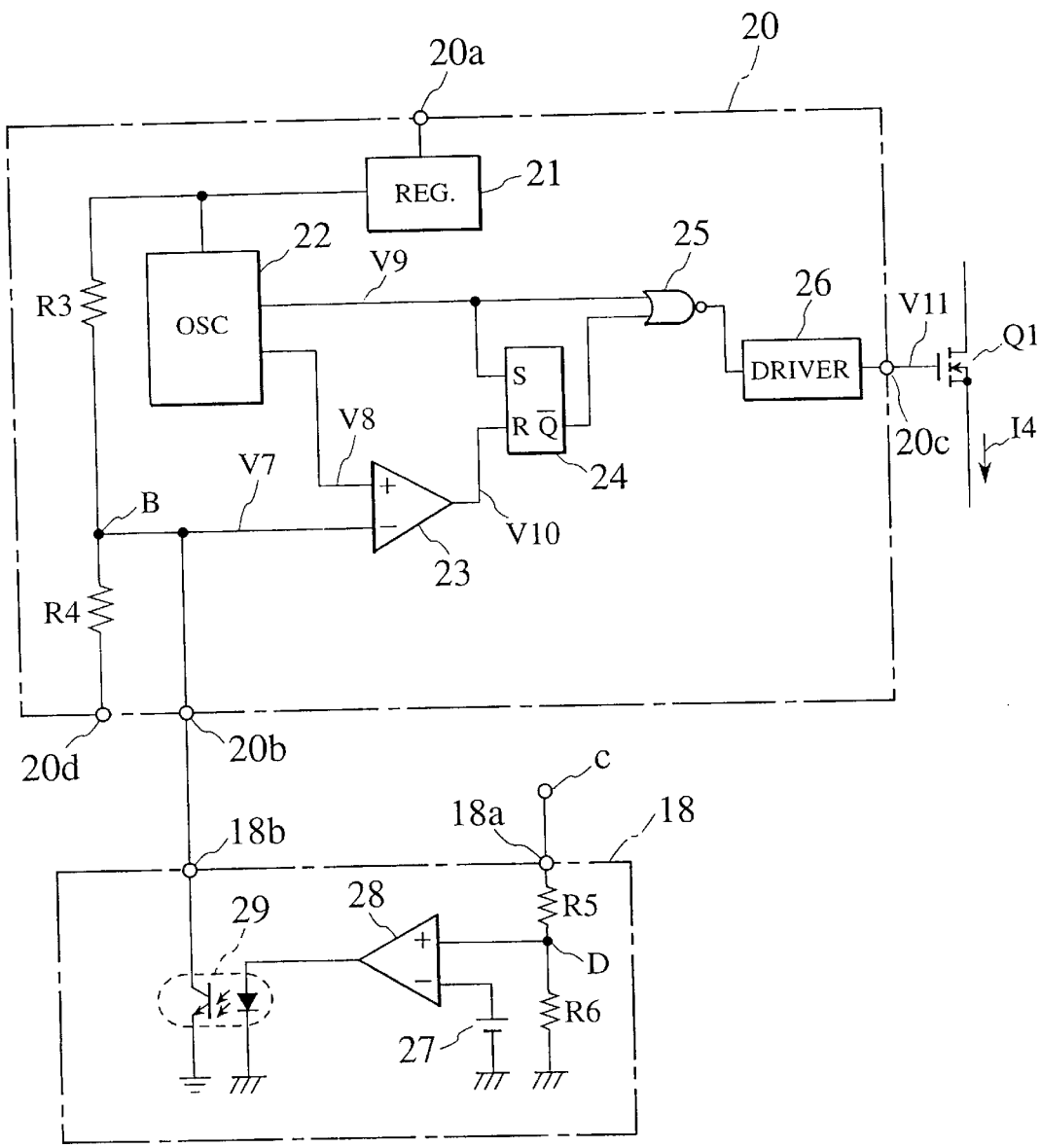
FIG. 1B is a detailed configuration of a control circuit of the switch-mode dc power supply shown in FIG. 1A.

The control circuit 30 has a regulator 31, a flip-flop 24, a NOR gate 25, and a driver 26, similar to those shown in FIG. 1B. Furthermore, the control circuit 30 has an oscillator (OSC) 32 and a comparator 33. The oscillator (OSC) 32 outputs a rectangular synchronizing pulse signal V14 for determining dead time of the driver 26 in synchronism with a triangular reference voltage V13. The triangular reference voltage V13 has a periodic triangular waveform, rising linearly with time from the lowest voltage to the highest voltage, and then falling linearly with time from the highest voltage to the lowest voltage. The comparator 33 compares a control voltage signal V16, obtained by a regulated current flowing from the regulator 31, with the voltage signal V15 at the connection point F of the first series circuit. And, when the voltage control signal V15 is greater than the control voltage signal V16, the comparator 33 sends an output signal V17 to the R terminal of the flip-flop 24.

FIG. 2C is a timing chart explaining the operation of the switch-mode dc power supply of the current-mode control scheme. When the input terminals 1 and 2 are connected to the commercial ac power line, the rectifier/smoothing circuit 3 rectifies and smoothes the ac current. Then, the dc current obtained by the rectifier/smoothing circuit 3 is applied to the second series circuit, including the resistor R2 and the capacitor 9, and a control power at a predetermined voltage is obtained at the connection point A on the second series circuit. The control power is supplied to the control circuit 30 via the input terminal 30a. When the control power is supplied, the control circuit 30 commences operation, and generates a sequence of pulses to the primary winding 5 of the HF transformer 4 by driving the semiconductor switching element Q1 between the ON and OFF states. In addition, the control circuit 30 induces another sequence of pulses in the secondary winding 10 of the HF transformer 4 based on the winding turns ratio of the two windings, thereby obtaining a rectified and smoothed dc voltage from the diode 11 and the capacitor 12.

The regulator 31 of the control circuit 30 supplies a predetermined dc voltage obtained from the controlling power supply to the oscillator 32. And in addition, the regulator 31 supplies a regulated current, based on the predetermined voltage, to the resistor R4 and to the input terminal (the minus-side input terminal) of the comparator 33. The voltage at the minus-side input terminal of the comparator 33 is defined as "the control voltage signal V16". Furthermore, as shown in FIG. 2C, the oscillator 32 outputs the rectangular synchronizing pulse signal V14, for determining the dead time of the driver 26 in synchronism with the triangular reference voltage V13, to the NOR gate 25 and the S terminal of the flip-flop 24. The rectangular synchronizing pulse signal V14 holds the "H" levels only while the triangular reference voltage V13 is descending.

The comparator 23 compares the voltage signal V15 at the connection point F with the control voltage signal V16, and, when the voltage signal V15 has exceeded the control voltage signal V16, transmits an output signal V17 to the R terminal of the flip-flop 24. The flip-flop 24 outputs a signal (not shown) from the "Q-bar" terminal, which is at the "H" level when the rectangular synchronizing pulse signal V14 is at the "L" level and the output signal V17 is at the "L" level. And the signal at the "Q-bar" terminal is at the "L" level when the rectangular synchronizing pulse signal V14 is at the "L" level and the output signal V17 is at the "H" level. Furthermore, when the rectangular synchronizing pulse signal V14 and the output signal V17 are both at the "H" level, the signal obtained at the "Q-bar" terminal is at the "H" level. The NOR gate 25 inverts the signal output from the flip-flop 24, and sends the inverted signal (not shown) to the driver 26. When the driver 26 receives the signal from the NOR gate 25, it transmits a drive signal V18, shown in FIG. 2C, to the gate electrode G of the semiconductor switching element Q1.

As shown in FIG. 2C, the drive signal V18 repeatedly swings between the H and the "L" levels. Namely, the drive signal V18 becomes the "H" level when the triangular reference voltage V13 rises from the lowest voltage. And the drive signal V18 becomes the "L" level, when the dc voltage of the secondary side of the HF transformer 4 exceeds the reference voltage 27 and the output signal V17 from the comparator 33 has risen to the "H" level.

That is, with light load, the current flowing through the semiconductor switching element Q1, which performs the switching operation using the charge and discharge of the gate input capacitance, manifests a stable current waveform I5, driven by the drive signal V18.

In the switch-mode dc power supply employing the current-mode control scheme, the peak current I5 of the semiconductor switching element Q1 at the resistor R1 is measured, and converted to the voltage signal V15. And, the voltage signal V15 is directly compared with the control voltage signal V16 so as to control the peak current I5. Here, the control voltage signal V16 is the feedback voltage signal from the output voltage obtained on the secondary side of the HF transformer 4. Consequently, the oscillation, which tends to occur in the voltage-mode control scheme, is not likely to occur and operation is stable.

However, the voltage signal level (current peak value) for detecting the current flowing through the semiconductor switching element Q1 cannot be set to a high value so as no to increase the power dissipation in the resistor R1. That is, the voltage signal V15 cannot be raised to a high value. As a consequence, the voltage signal V15 has a low noise margin with respect to the control voltage signal V16, and operation is especially liable to become unstable due to the influence of noise with light load. Furthermore, in the current-mode control scheme, the operation with heavy load makes the duty ratio exceeds over 50%, while a continuous inductor current is flowing through the semiconductor switching element Q1. And "a subharmonic oscillation phenomenon" may be generated, as shown in FIG. 2C, consequently destabilising the operation. Here, "the subharmonic oscillation phenomenon" is a phenomenon in which the ON period of the semiconductor switching element Q1 fluctuates, and sound is generated from the HF transformer, increasing the ripple. Since "the subharmonic oscillation phenomenon" occurs irrespective of the phase of the control, the system must be reset when "the subharmonic oscillation phenomenon" has occurred. In this case, there is the same problem as in the voltage-mode control scheme. That is a considerable time must be wasted for adjusting, or redesigning the circuit. Furthermore, one (or two) of the methods for preventing "the subharmonic oscillation phenomenon" is (are) to add a downward sloping saw wave to the control voltage signal V16, and/or to add an upward sloping saw wave to the control voltage signal V16. However, since both of these methods require a dedicated circuit specifically for preventing the subharmonic oscillation phenomena, they have a disadvantage of increasing the complexity of the circuit. And it raises the cost of the integrated circuit, or the power IC merging the circuit on a semiconductor chip.

(First Embodiment)

FIG. 3A is a schematic configuration of a switch-mode dc power supply according to a first embodiment of the present invention. The switch-mode dc power supply of the first embodiment includes a series circuit (a first series circuit), a rectifier 11, an output smoothing circuit 12, detection circuit 18, an adding circuit 42, a triangular wave generator 41 and a control signal generator 46. Here, the first series circuit includes a primary winding 5 of a HF transformer 4, a semiconductor switching element Q1 and a current detection unit R1 connected between two output terminals 3a and 3b of a rectifier/smoothing circuit 3. Further, the switch-mode dc power supply includes a second series circuit consisting of a resistor R2 and a capacitor 9, and a diode 8 connected to a connection point A between the resistor R2 and a capacitor 9. An anode terminal of the rectifier 11 is connected to an end 10a of a secondary winding 10 of the HF transformer 4. The output smoothing circuit 12 is connected between a cathode terminal of the rectifier 11 and other end 10b of the HF transformer 4. The detection circuit 18 is connected to a connection point between the rectifier 11 and the output smoothing circuit 12. The connection point between the rectifier 11 and the output smoothing circuit 12 serves as a detection point C for the detection circuit 18. The adding circuit 42 is connected between the detection circuit 18 and a connection point F between the semiconductor switching element Q1 and the current detection unit R1. The triangular wave generator 41 is connected to the adding circuit 42. And the control signal generator 46 is connected between the adding circuit 42 and a control electrode of the semiconductor switching element Q1, and further is connected to the triangular wave generator 41. An output terminal 14 of the switch-mode dc power supply is connected to the connection point between the rectifier 11 and the output smoothing circuit 12. Another output terminal 15 of the switch-mode dc power supply is connected to another end 10b of the secondary winding 10 of the HF transformer 4. And a load 13 is connected between the output terminals 14 and 15. The rectifier 11 and the output smoothing circuit 12 are a diode 11 and a capacitor 12, respectively in FIG. 3A. And the current detection unit is a resistor R1. As the semiconductor switching element Q1, a power MOSFET is employed in the first embodiment.

The switch-mode dc power supply shown in FIG. 3A uses the current-mode control scheme to add voltages. That is, a voltage corresponding to a dc current of the secondary side of the HF transformer 4 is added to a voltage, corresponding to a current I3 flowing through the semiconductor switching element Q1, when the semiconductor switching element Q1 is in a conductive state. Then a highly stable dc voltage in the secondary side of the HF transformer 4 is achieved irrespective of whether there is a light or a heavy load.

Figure 3B:
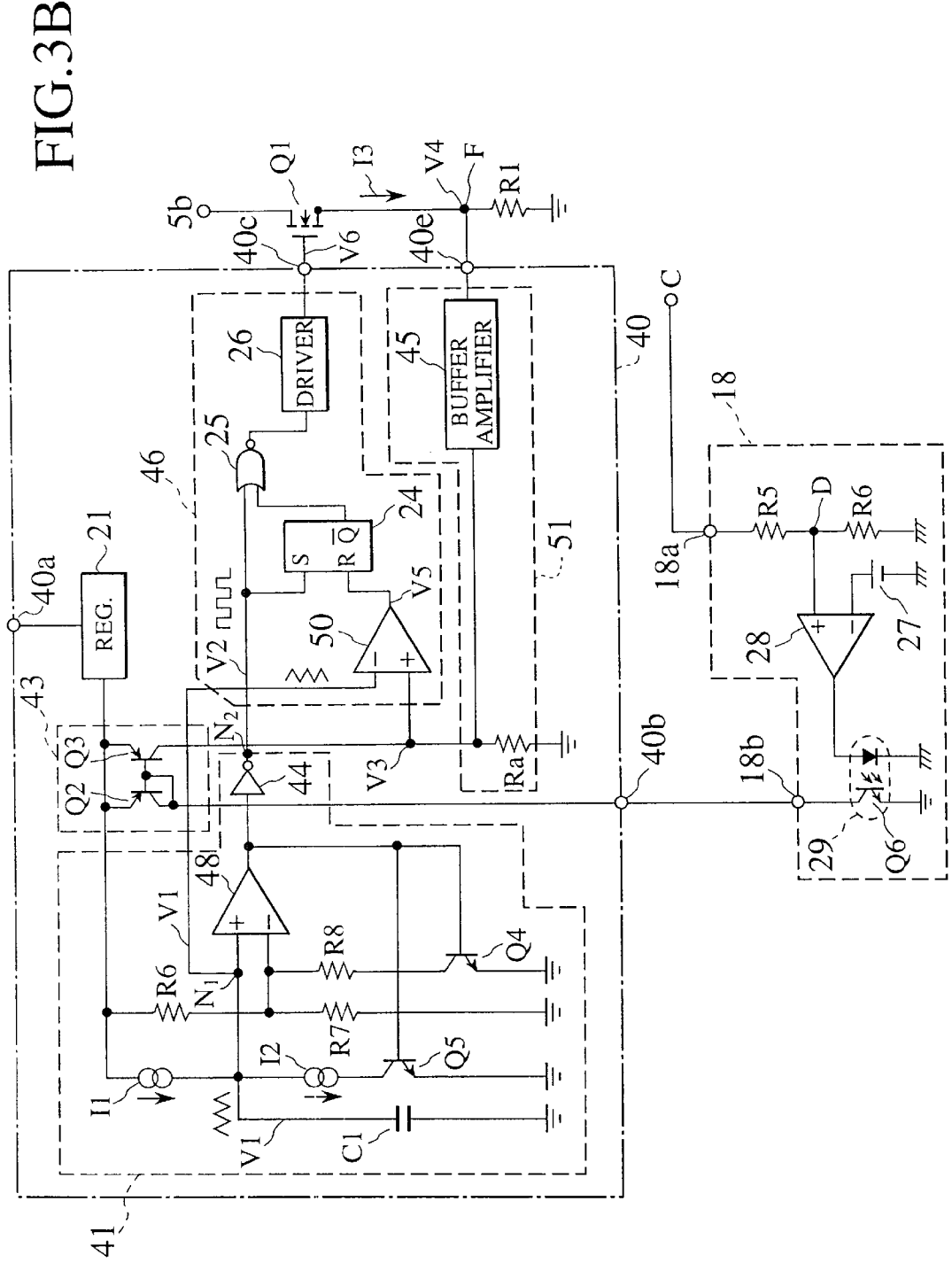
FIG. 3B is a detailed configuration of a control circuit and a detection circuit shown in FIG. 3A.

In the switch-mode dc power supply of the first embodiment, the detection circuit 18 detects a dc voltage at the detection point C, and outputs the detected value to a second input terminal 40b of a control circuit 40 described later. And, as shown in FIG. 3A, a first output terminal 40c of the control circuit 40 is connected to the control electrode, or a gate electrode G of the semiconductor switching element (the power MOSFET) Q1. A second output terminal 40d of the control circuit 40 is connected to the output terminal 3b of the rectifier/smoothing circuit 3. And in addition, a first input terminal 40a is connected to a connection point A, a second input terminal 40b is connected to the detection circuit 18, and a third input terminal 40e is connected to the connection point F. As shown in FIG. 3A, the control circuit 40 further has a regulator 21, which supplies a regulated current using the control power at the first input terminal 40a. The triangular wave generator 41 in the control circuit 40 outputs a triangular reference voltage V1, which has a periodic triangular waveform, repeating a pattern of rising linearly with time from the lowest to the highest voltage, and falling linearly with time from the highest to the lowest voltage. The triangular wave generator 41 further outputs a rectangular synchronizing pulse signal V2, for determining the dead time of a driver 26 (See FIG. 3B), in synchronism with the triangular reference voltage V1.

The adding circuit 42 in the control circuit 40 has a current mirror 43 and a current detector 51. The current mirror 43 is connected between the triangular wave generator 41 and the control signal generator 46. And the current detector 51 is connected between the current mirror 43 and the connection point F on the first series circuit. The current detector 51 has a resister Ra and an amplifier 45. The resister Ra is connected between the current mirror 43 and ground (GND). And the amplifier is a buffer amplifier 45, and is connected between the current mirror 43 and the connection point F on the first series circuit. The buffer amplifier 45 is connected via a third input terminal 40e to the connection point F. The adding circuit 42 obtains an augmented voltage signal V3 by adding a voltage corresponding to the dc voltage Vout of the secondary side of the HF transformer 4 to a voltage V4 corresponding to the current I3, flowing to the connection point F.

The control signal generator 46 in the control circuit 40 receives the triangular reference voltage V1, the rectangular synchronizing pulse signal V2, and the augmented voltage signal V3. And, based on the timing of the rise and fall of these signals V1, V2, V3, the control circuit 40 outputs a drive signal V6 having a specific duty ratio. The potential level of the drive signal V6 is kept at "H" level, from the start of the fall of the triangular reference voltage V1 to the period when this falling line intersects the potential level of the augmented voltage signal V3.

As shown in FIG. 3B, the triangular wave generator 41 in the control circuit 40 has regulated current sources I1 and I2, and a transistor Q5, connected in series. A capacitor C1 is connected in parallel to a series circuit including the regulated current source I2 and the transistor Q5. Moreover, another series circuit including resistors R6 and R7 is connected in parallel to the series circuit including the regulated current sources I1 and I2 and the transistor Q5. In addition, the triangular wave generator 41 is connected to the regulator 21 via a current mirror 43, which will be described later. Furthermore, the triangular wave generator 41 has a comparator 48 and a transistor Q4. The comparator 48 has a plus-side input terminal connected to the connection point between the capacitor C1 and the regulated current source I2, and a minus-side input terminal connected to a voltage-division point of the resistors R6 and R7. The transistor Q4 has its collector electrode connected via a resistor R8 to the minus-side input terminal of the comparator 48, and its base electrode connected to the output terminal of the comparator 48. Furthermore, the triangular wave generator 41 has a transistor Q5 having its base electrode connected to the output terminal of the comparator 48, and its collector electrode connected to the regulated current source I2. The triangular wave generator 41 further has a NOT gate 44, or an inverter, for outputting the rectangular synchronizing pulse signal V2, obtained by inverting the output from the comparator 48. The rectangular synchronizing pulse signal V2 is outputted at a second output node $N_2$. And the plus-side input terminal of the comparator 48 is connected to the minus-side input of a comparator 50 of the control signal generator 46. The triangular wave generator 41, having these components connected in the manner described above, generates the triangular reference voltage V1 at the plus-side input terminal of the comparator 48. The triangular reference voltage V1 is outputted at a first output node $N_1$. The rectangular synchronizing pulse signal V2 outputted from the second output node $N_2$ determines the dead time of the driver 26, in synchronism with the triangular reference voltage V1.

The current mirror 43 has a first transistor Q2 and a second transistor Q3. The first transistor Q2 has a first emitter electrode, a first collector electrode connected to the detection circuit 18 and a first base electrode connected to the first collector electrode. The second transistor Q3 has a second emitter electrode connected to the first emitter electrode of the first transistor Q2, a second collector electrode connected to the current detector 51 and a second base electrode connected to the first base electrode. That is, one end of the resistor Ra is connected jointly to the collector electrode of the second transistor Q3 of the current mirror 43, the plus-side input terminal of the comparator 50 of the control signal generator 46, and the output terminal of the buffer amplifier 45. And the collector electrode of the second transistor Q3 is jointly connected to one end of the resistor Ra, the plus-side input terminal of the comparator 50 of the control signal generator 46, and the output terminal of the buffer amplifier 45.

As shown in FIG. 3B, the detection circuit 18 has a differential amplifier 28 and an optical coupler 29. The differential amplifier 28 has a input terminal (plus-side input terminal) for receiving a voltage output from the output smoothing circuit 12, and another input terminal (minus-side input terminal) for receiving a reference voltage 27, and an output terminal. The optical coupler 29 is connected to the output terminal of the differential amplifier 28 having an output terminal 18b for supplying a current to the adding circuit 42. The detection circuit 18 further has resisters R5 and R6. An end of the resister R5 is connected to the detection point C via input terminal 18a, and other end of the resister R5 is connected to an end of the resister R6 through the connection point D. Other end of the resister R6 is grounded. Then the resisters R5 and R6 divide the potential at the detection point C, and the potential obtained at the connection point D is fed to the plus-side input terminal of the differential amplifier 28. The optical coupler 29 consists of a light emitting element and a phototransistor Q6. The collector electrode of a phototransistor Q6 is connected to the collector electrode of the first transistor Q2 of the current mirror 43 via the second input terminal 40b and an output terminal 18b.

That is, the adding circuit 42 generates the augmented voltage signal V3, by adding a voltage corresponding to the dc voltage Vout on the secondary side of the HF transformer 4 to the voltage V4 obtained at the connection point F on the first series circuit. And the adding circuit 42 supplies this augmented voltage signal V3 to the plus-side input terminal of the comparator 50 of the control signal generator 46.

As shown in FIG. 3B, the control signal generator 46 has the comparator 50, a flip-flop 24, a logic gate 25 and a driver 26. The comparator 50 has the input terminal (plus-side input terminal) connected to the adding circuit 51, another input terminal (minus-side input terminal) connected to the first output node $N_1$ of the triangular wave generator 41, and an output terminal. The plus-side input terminal is further jointly connected to the collector electrode of the second transistor Q3 of the current mirror 43 and the output terminal of buffer amplifier 45. The flip-flop has a R terminal connected to the output terminal of the comparator 50, an S terminal connected to the second output node $N_2$ of the triangular wave generator 41, and a "Q-bar" terminal. The logic gate is a NOR gate 25 having an input terminal connected to the second output node $N_2$ of the triangular wave generator 31, another input terminal connected to the "Q-bar" terminal of the flip-flop 24, and an output terminal. The driver 26 is connected to the output terminal of the logic gate (NOR gate) 25.

When the augmented voltage signal V3 has increased to reach or exceed the potential level of the triangular reference voltage V1, which is also the rising period, the comparator 50 set a signal V5 at "H" level. The output signal V5 from the comparator 50 is inputted to the R terminal of the flip-flop 24, and the pulse signal V2, which is outputted from the NOT gate 44, is inputted to the S terminal of the flip-flop 24. The rectangular synchronizing pulse signal V2 from the NOT gate 44 is inputted to one of the input terminals of the NOR gate 25, and the signal from the "Q-bar" terminal of the flip-flop 24 is inputted to the other input terminal of the NOR gate 25. The NOR gate 25 calculates a logical NOR of these signals and sends the result to the driver 26.

That is, the control signal generator 46 receives the triangular reference voltage V1, the rectangular synchronizing pulse signal V2, and the augmented voltage signal V3 and, based on the timing of the rise and fall of these signals V1, V2, V3, outputs the drive signal V6. The drive signal V6 keeps the "H" level from the start of the descending of the triangular reference voltage V1 to the time when the potential level of the triangular reference voltage V1 becomes low enough to intersect the level of the augmented voltage signal V3.

(Hybrid IC)

Figure 3C:
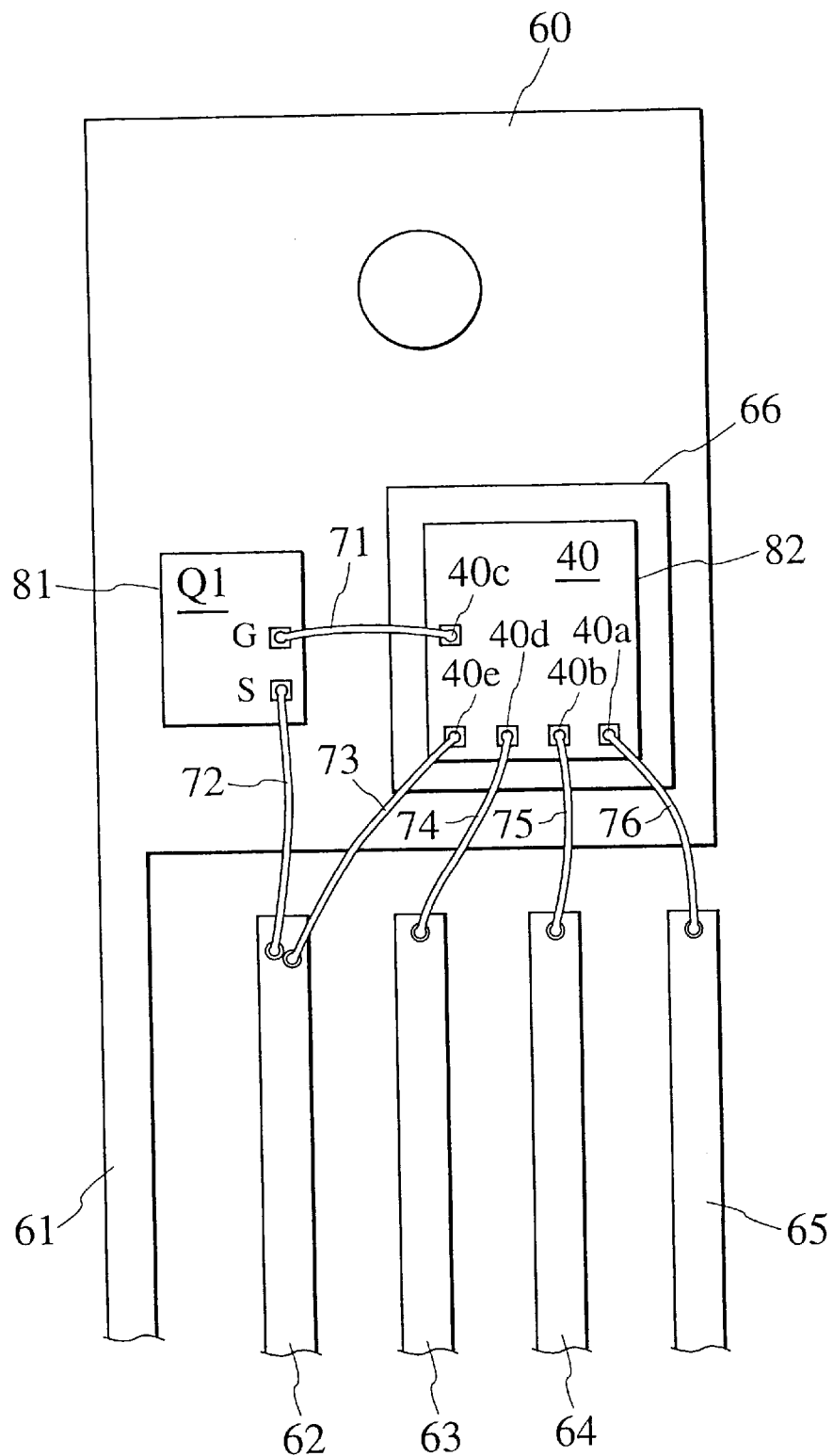
FIG. 3C is a plan view of a hybrid IC mounting a semiconductor switching element and the control circuit of the switch-mode dc power supply according to the first embodiment of the present invention.

FIG. 3C is a plan view of a hybrid IC mounting a semiconductor switching element Q1 and the control circuit 40 of the switch-mode dc power supply according to the first embodiment of the present invention. Namely, the hybrid IC of the first embodiment comprises a conductive base substrate 60; an insulating plate 66 disposed on a part of the conductive base substrate 60; a first semiconductor chip 81 disposed on another part of the conductive base substrate 60; and a second semiconductor chip 82 disposed on the insulating plate 66.

Here, the first semiconductor chip 81 merges the semiconductor switching element Q1. And the second semiconductor chip 82 merges the regulator 21, the adding circuit 42, the triangular wave generator and the control signal generator 46 as shown in FIGS. 3A and 3B. Further the second semiconductor chip 82 has first input terminal 40a, second input terminal 40b, third input terminal 40e, first output terminal 40c and second output terminal 40e disposed at periphery of the second semiconductor chip 82. Each of the first, second and third input terminals and the first and second output terminals made of a thin metallic film so as to form a bonding pad. These bonding pads 40a, 40b, 40c, 40d and 40e are disposed on a field insulating film such as a field silicon oxide ($SiO_2$) film formed on the second semiconductor chip 82 having a thickness of 300 nm to 2 $\mu$m. Although the details are not shown in FIG. 3C, it is of course that the regulator 21, the adding circuit 42, the triangular wave generator 41, and the control signal generator 46 are merged on a surface of the second semiconductor chip 82. Active elements such as transistors constructing these circuits 21, 41, 42 and 46 are formed in window parts (or the active areas) of the field insulating film. The detailed circuit configuration on the surface of the second semiconductor chip 82 is inherently same as shown in FIGS. 3A and 3B, and the overlapped description or the redundant description is omitted in FIG. 3C. Then the regulator 21 is connected to the first input terminal 40A, the adding circuit 42 is connected to the regulator 21, the second input terminal 40b and third input terminal 40e. The triangular wave generator 41 is connected to the adding circuit 42. And the control signal generator 46 is connected between the adding circuit 42 and the first output terminal 40c, and further connected to the triangular wave generator 41.

And the first semiconductor chip 81 has a gate terminal G disposed on a surface of the first semiconductor chip 81 and a source terminal S disposed on the surface of the first semiconductor chip 81. The gate terminal G and the source terminal S are made of thin metallic film so as to form bonding pads. These bonding pads G and S are disposed on a field insulating film such as a field silicon oxide ($SiO_2$) film formed on the first semiconductor chip 81 having a thickness of 300 nm to 2 $\mu$m. The semiconductor switching element Q1 is formed in a window part of the field insulating film.

As shown in FIG. 3C, the hybrid IC further has a first conductive lead 62, a second conductive lead 63, a third conductive lead 64 and fourth conductive lead 65 disposed electrically isolated from the conductive base substrate 60. The conductive base substrate 60 has a conductive lead 60 being united to the conductive base substrate 60 so as to form one body. Then a first bonding wire 71 connects the gate terminal G to the first output terminal 40c. A second bonding wire 72 connects the source terminal S to the first conductive lead 62. Similarly, a third bonding wire 73 connects the third input terminal 40e to the first conductive lead 62, a fourth bonding wire 74 connects the second output terminal 40d to the second conductive lead 63, a fifth bonding wire 75 connects the second input terminal 40b to the third conductive lead 64 and a sixth bonding wire 76 connects the first input terminal 40a to the fourth conductive lead 65 These bonding wires 71 to 75 are bonded to corresponding bonding pads G, S, 40a, 40b, 40c, 40d and 40e through windows formed in passivation films disposed on the first and second semiconductor chips 81 and 82. The passivation films may be the silicon oxide ($SiO_2$) film, phosphosilicate glass (PSG9 film, boro-phosphate-silicate glass (BPSG) film, silicon nitride ($Si_3N_4$) film or polyimide film, etc.

(Operation with Light Load)

The operation of the switch-mode dc power supply having a light load will be explained with reference to a timing chart shown in FIG. 4A. When the input terminals 1 and 2 are connected to the commercial ac power line, the rectifier/smoothing circuit 3 rectifies and smoothes the ac current. Then, the unregulated dc voltage Vin obtained by the rectifier/smoothing circuit 3 is applied to a second series circuit, including the resistor R2 and the capacitor 9, generating a predetermined voltage (e.g. 7 Volts), at the connection point A, acting as "a control power". "The control power" is supplied to the control circuit 40 via the first input terminal 40a thereof. When the control power is supplied, the control circuit 40 commences operation, and generates a sequence of pulses in the primary winding 5 of the HF transformer 4 by turning the semiconductor switching element Q1 on and off. In addition, the control circuit 40 induces another sequence of pulses in the secondary winding 10 of the HF transformer 4 based on the winding turns ratio of the two windings. The pulses in the secondary winding 10 of the HF transformer 4 are rectified and smoothed by the diode 11 and the capacitor 12 so as to obtain a rectified and smoothed dc voltage Vout.

The regulator 21 of the control circuit 40 supplies the predetermined voltage (e.g. 7 Volts) from "the control power", and charges the capacitor C1 of the triangular wave generator 41 using a regulated current I1 based on the predetermined voltage. According to the charging, the potential V1 of the capacitor C1 begins to increase at a constant slope. At first, the potential level of the output terminal of the comparator 48 is kept at the "L" level. With the "L" level, the transistors Q4 and Q5 are kept at cut off state, and the potential on the minus-side input terminal of the comparator 48 is a potential (e.g. 4 Volts) determined by the voltage-division ratio of the resistors R6 and R7. Then, after a predetermined period, when the potential V1 of the capacitor C1 increases to reach a maximum value, or the potential (e.g. 4 Volts) determined by the voltage-division ratio of the resistors R6 and R7, the output terminal of the comparator 48 is inverted to the "H" level. Then, the transistors Q4 and Q5 turn on so that the resistor R8 connects in parallel to the resistor R7. Hence, the potential of the minus-side input terminal of the comparator 48 drops below the potential determined by voltage-division ratio of the resistors R6 and R7 (e.g. 1 Volt). At this time, a current I2, which has a higher value than the regulated current I1, flows to discharge the capacitor C1, and the potential V1 of the capacitor C1 starts to decrease from the maximum value to a minimum value at a constant slope. When the potential V1 of the capacitor C1 has decreased to reach the minimum value, the potential level of the output terminal of the comparator 48 becomes the "L" level. When the output terminal of the comparator 48 becomes the "L" level, the transistors Q4 and Q5 turn off again. Then the regulated current I1 begins to recharge the capacitor C1 so as to increase the potential V1 at a constant slope. And the potential on the minus-side input terminal of the comparator 48 starts to increase again. Like this way, the capacitor C1 and the comparator 48 generate the triangular reference voltage V1 as shown in FIG. 4A, having a frequency determined by the time constant associated with the repeating operation described above. As shown in FIG. 4A, an instantaneous value of the triangular reference voltage V1 rises lineally with time from the lowest level to the highest level with a predetermined slope. And the instantaneous value of the triangular reference voltage V1 descends lineally with time from the highest level to the lowest level with another predetermined slope, and repeats the rising and descending. And the rectangular wave pulse signal VP is generated at the output terminal of the comparator 48 in synchronism with the triangular reference voltage V1. The rectangular wave pulse signal Vp at the output terminal of the comparator 48 keeps the "L" level while the triangular reference voltage V1 is increasing from the minimum to the maximum value. Then, the NOT gate 44 inverts the pulse VP to obtain the rectangular synchronizing pulse signal V2. The rectangular synchronizing pulse signal V2 keeps the "H" level when the triangular reference voltage V1 is increasing from the minimum to the maximum value as shown in FIG. 4A. That is, the rectangular synchronizing pulse signal V2 is at "H" level between the rising period of the triangular reference voltage V1, and at "L" level between the descending period of the triangular reference voltage V1. And the pulse signal V2 is send to the NOR gate 25 and the S terminal of the flip-flop 24. The "H" level period of the rectangular synchronizing pulse signal V2 defines "the dead time". Therefore, the waveform of the triangular reference voltage V1, or the maximum duty ratio of the semiconductor switching element Q1 is determined by the ratio between the regulated currents I1 and I2. Note that a large voltage difference is preferable between the minimum value ("L" level) and the maximum value ("H" level) of the triangular wave.

On the other hand, as shown in FIG. 3A, the detection circuit 18 detects the dc voltage Vout at the detection point C on the secondary side of the HF transformer 4. And the differential amplifier 28 controls the optical coupler 29 in correspondence with the voltage difference between the reference voltage 27 and the dc voltage at the voltage-division point D, obtained by the resistors R5 and R6. For instance, with light load, when the dc voltage at the detection point C rises, the voltage difference with the reference voltage 27 is considerable, and consequently the output level of the differential amplifier 28 rises. Then the light emitting element in the optical coupler 29 emit considerable number of photons so that the phototransistor Q6 of the optical coupler 29 turn to a low impedance state. As a consequence, relatively large current flows from the collector electrode of the first transistor Q2 of the current mirror 43, via the phototransistor Q6, to ground. And the second transistor Q3 of the current mirror 43 supplies a further large current having a value, multiplied by a predetermined value, or the emitter width ratio of the current mirror, in proportion with the value of the current flowing through the first transistor Q2, to the resistor Ra. That is, a very large current signal corresponding to the current with light load, being feed back amplified, is supplied to the resistor Ra.

In this situation, the current I3 flowing through the semiconductor switching element Q1, during the ON state of the semiconductor switching element Q1, is supplied to both the resistor R1 and the resistor Ra. And in addition, the buffer amplifier 45 converts the voltage signal V4 to a large current, having a value proportional to the current I3, and the large current is supplied to the resistor Ra.

That is, the adding circuit 42 generates the augmented voltage signal V3, adding the voltage corresponding to the secondary side dc voltage Vout to the voltage V4 at the connection point F on the first series circuit. Here, the voltage V4 corresponds to the current I3 flowing through the semiconductor switching element Q1. And the augmented voltage signal V3 is supplied to the plus-side input terminal of the comparator 50 of control signal generator 46. Therefore, with light load, the voltage generated at one end of the resistor Ra is higher than with heavy load. And since the voltage V4, corresponding to the current I3 flowing through the semiconductor switching element Q1, is added to the voltage generated at one end of the resistor Ra. Hence, the augmented voltage signal V3, which has a high voltage with respect to ground level as shown in FIG. 4A, is obtained at the plus-side input terminal of the comparator 50 of control signal generator 46.

Next, the comparator 50 compares the augmented voltage signal V3 with the triangular reference voltage V1. And, as shown in FIG. 4A, when the potential level of the augmented voltage signal V3 has exceeded the potential level of the triangular reference voltage V1, the comparator 50 outputs an "H" level signal V5 to the R terminal of the flip-flop 24. Then, the NOR gate 25 sends an inverted logical sum (NOR) of the signal output from the flip-flop 24 and the rectangular synchronizing pulse signal V2 to the driver 26. As shown in FIG. 4A, when the driver 26 receives this signal from the NOR gate 25, it sends to the gate electrode of the semiconductor switching element Q1 the drive signal V6. The drive signal V6 is at the "H" level when the potential level of the triangular reference voltage V1 has just started to decrease from the highest peak of the triangular reference voltage V1. Then the drive signal V6 keeps the "H" level until to the time when the potential level of the triangular reference voltage V1 becomes low enough to reach the potential level of the augmented voltage signal V3. The time when the potential level of the augmented voltage signal V3 reaches the potential level of the triangular reference voltage V1 is the time when the output signal V5 is turned to an "H" level from the "L" level. And, when the drive signal V6 having the "H" level is supplied to the gate electrode of the semiconductor switching element Q1, the semiconductor switching element Q1 turns into conductive state so that the current I3 flows in the semiconductor switching element Q1.

Figure 4A:
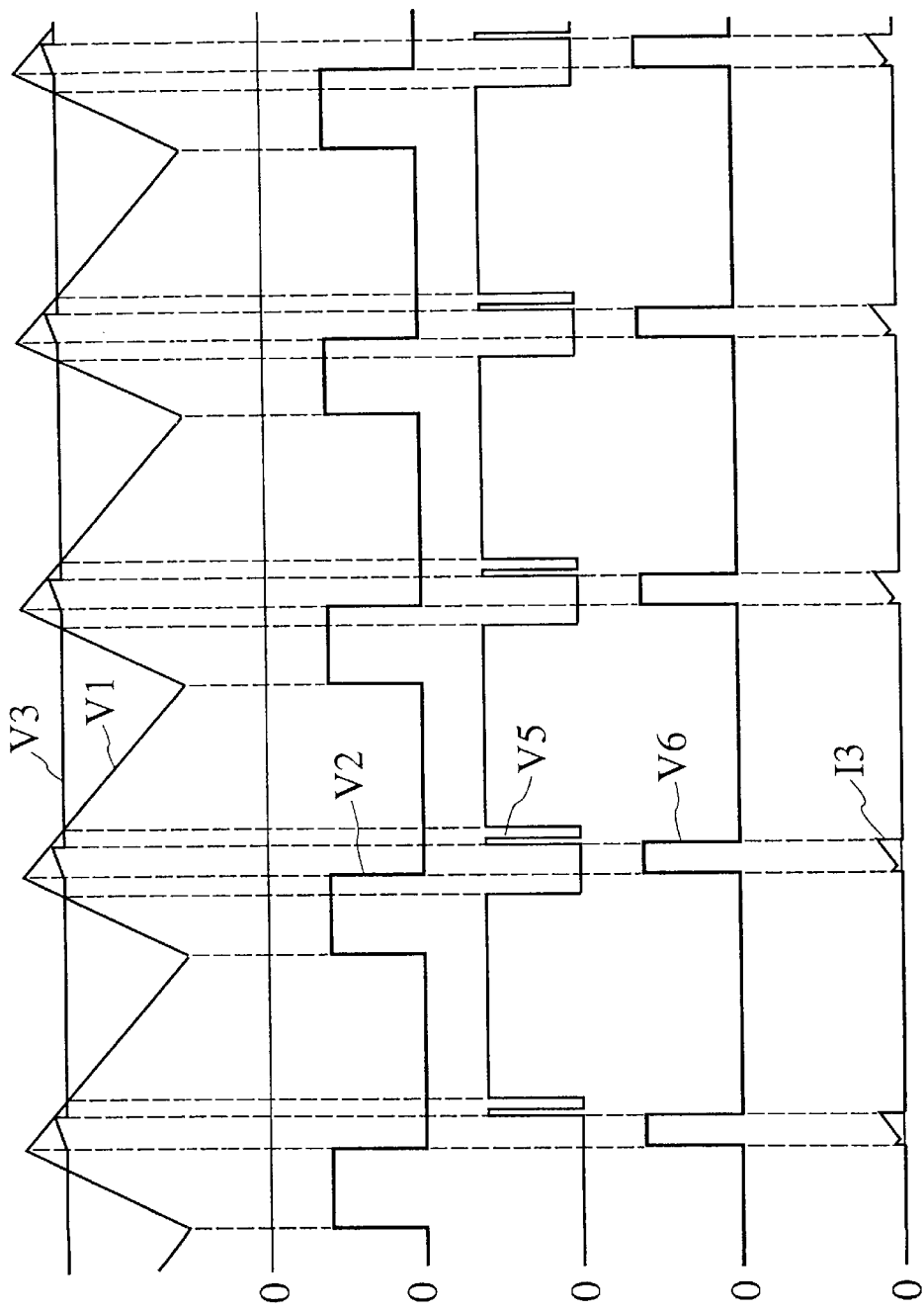
FIG. 4A is a timing chart explaining an operation of the switch-mode dc power supply according to the first embodiment with a light load.

As shown in FIG. 4A, the duty ratio of the drive signal V6 for the light load is less than 50%. That is, just when the highest potential of the augmented voltage signal V3 has increased to reach the potential level of the descending waveform of the triangular reference voltage V1, a pulse of the output signal V5 is generated. And then, the potential level of the output signal V5 is kept to be at a "H" level. Namely, the leading edge of the output signal V5 is in synchronism with the time when the augmented voltage signal V3 has increased to reach the potential level of the triangular reference voltage V1. And the peak of the triangular reference voltage V1 is in synchronism with the trailing edge of the rectangular synchronizing pulse signal V2. And in addition, the drive signal V6 having a leading edge in synchronism with the peak of the triangular reference voltage V1 and also with the trailing edge of the rectangular synchronizing pulse signal V2 is generated. The drive signal V6 keeps the "H" level during the potential level of the triangular reference voltage V1 is higher than the potential level of the augmented voltage signal V3. That is, the drive signal V6 keeps the "H" level until the pulse of the output signal V5 becomes "H" level. In this way the duty ratio is defined.

That is, with light load, the phototransistor Q6 is turned on to become the low impedance state so that the current mirror 43 becomes active. By the function of the current mirror 43, the current signal flowing in the resistor Ra (the current obtained as the feedback signal of the detected dc voltage in the secondary side of the HF transformer 4) is efficiently increased to a larger value. Hence the potential level of the augmented voltage signal V3 is increased so as to improve the noise margin with respect to ground level. As a consequence, the peak voltage of the augmented voltage signal V3 quickly reaches the potential level of the triangular reference voltage V1. Then it is possible to reduce the peak value of the current I3 flowing through the semiconductor switching element Q1 so as to reduce the power dissipation in the resistor R1. Therefore, in the switch-mode dc power supply of the current-mode control scheme shown in FIG. 3A, the duty ratio during continuous mode operation can be set to be less than 50% with light load. Consequently, "the subharmonic oscillation phenomenon" can be suppressed so as to stabilise the dc voltage on the secondary side of the HF transformer 4.

(Operation with Heavy Load)

The operation of the switch-mode dc power supply having a heavy load will be explained with reference to a timing chart shown in FIG. 4B. With the heavy load, the dc voltage Vout of the secondary side of the HF transformer 4 becomes lower than the voltage for the light load, and consequently the optical coupler 29 of the detection circuit 18 has a higher impedance. As a result, the first transistor Q2 and the second transistor Q3 of the current mirror 43 are nearly cut off state, and the augmented voltage signal V3 generated at one end of the resistor Ra is extremely low in comparison with its level with the light load. Therefore, since the voltage V4 corresponding to the current I3 flowing through the semiconductor switching element Q1 is added to the extremely low voltage, the augmented voltage signal V3 becomes low. For example, lower voltages of approximately 1 Volt to 2.5 Volts with respect to ground level are obtained at the plus-side input terminal of the comparator 50 in the control signal generator 46 shown in FIG. 4B. Then the period for the potential level of the augmented voltage signal V3 takes longer time to reach the potential level of the triangular reference voltage V1.

Next, the comparator 50 compares the augmented voltage signal V3 with the triangular reference voltage V1. And when the potential level of the augmented voltage signal V3 has increased to reach the potential level of the triangular reference voltage V1 as shown in FIG. 4B, the comparator 50 outputs an "H" level signal V5 to the R terminal of the flip-flop 24. Then, the NOR gate 25 sends an inverted logical sum (NOR) of the signal output from the flip-flop 24 and the rectangular synchronizing pulse signal V2 to the driver 26. As shown in FIG. 4B, when the driver 26 receives this signal from the NOR gate 25, it sends to the gate electrode of the semiconductor switching element Q1 the drive signal V6. The drive signal V6 is at a "H" level when the potential level of the augmented voltage signal V3 is at the highest peak of the triangular reference voltage V1. And the drive signal V6 keeps the "H" level from the period when the potential level of the augmented voltage signal V3 has dropped from the highest peak until to reach the potential level of the triangular reference voltage V1. Then the current I3 flows through the semiconductor switching element Q1 during the drive signal V6 is kept at the "H" level That is, with heavy load, by setting the phototransistor Q6 into cut off state, or the high impedance state, a dc current corresponding to the dc voltage detected in the secondary side of the HF transformer 4 is not transmitted from the current mirror 43 to the resistor Ra. Then, the dc component in the augmented voltage signal V3 is reduced so that the time required for the augmented voltage signal V3 to reach the triangular reference voltage V1 increas so as to raise the peak value of the current I3 flowing through the semiconductor switching element Q1. Consequently, when the load is heavy, the large current can be immediately obtained in the secondary side of the HF transformer 4, thereby stabilizing the dc voltage of the secondary side of the HF transformer 4.

(Compatibility with the Light and the Heavy Load)

For the light load, the current mirror 43 is activated so as to raise the potential level of the dc component in the augmented voltage signal V3, adding the voltage at the connection point F to the dc voltage detected in the secondary side of the HF transformer 4. Then the speed of the augmented voltage signal V3 to reach the potential level of triangular reference voltage V1 is increased, thereby lowering the peak value of the current I3 flowing through the semiconductor switching element Q1.

On the contrary, for the heavy load, current mirror 43 is not activated so as to reduce the dc component in the augmented voltage signal V3. And the speed of the peak value of the augmented voltage signal V3 reaches to the potential level of the triangular reference voltage V1 is lowered. Hence, the peak value of the current I3 flowing through the semiconductor switching element Q1 increases. Therefore, the output from the secondary side of the HF transformer 4 is stabilised.

(Second Embodiment)

Figure 5:
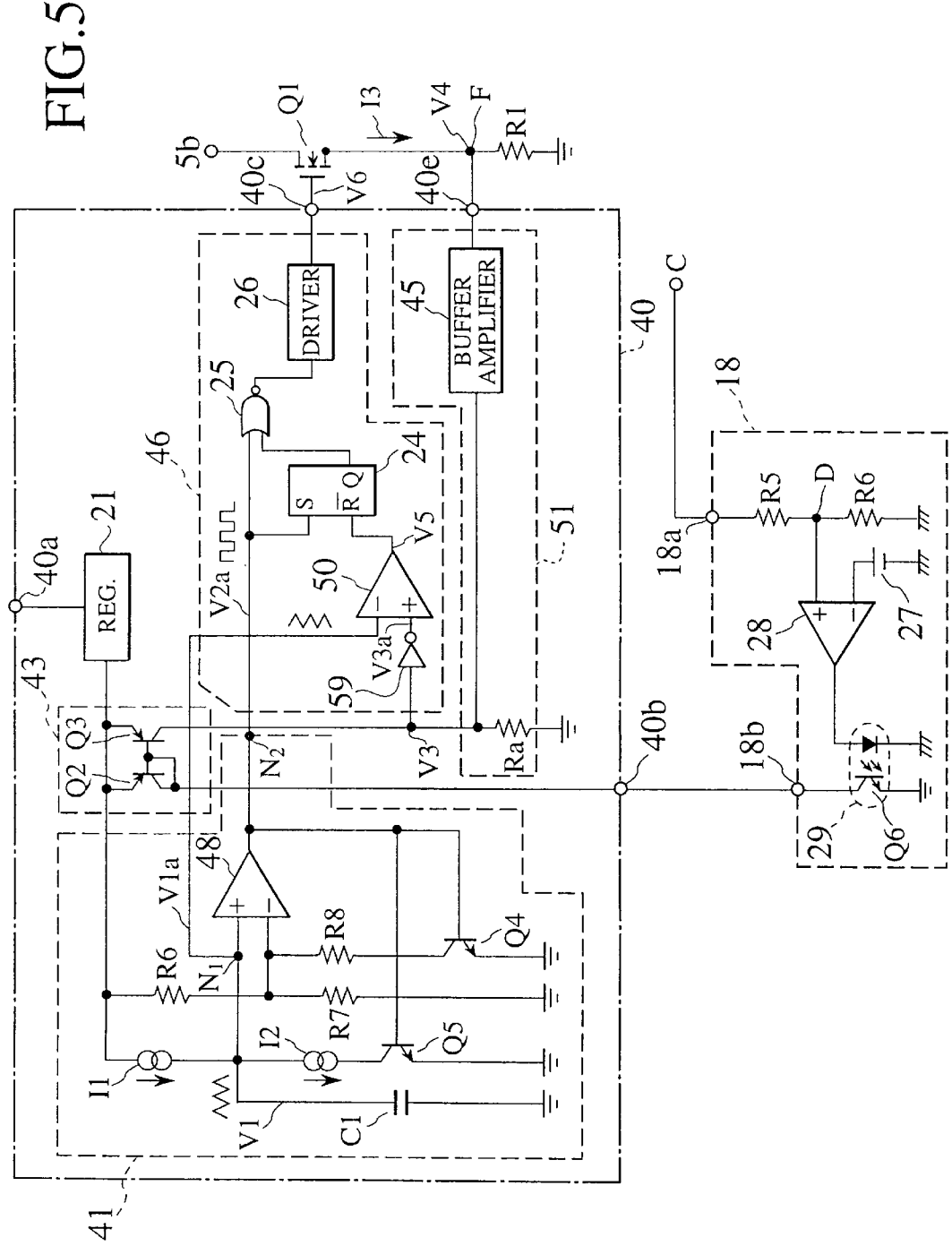
FIG. 5 is a schematic configuration of a control circuit and a detection circuit in a switch-mode dc power supply according to a second embodiment of the present invention.

FIG. 5 is a schematic configuration of a control circuit 40 and a detection circuit 18 in a switch-mode dc power supply according to a second embodiment of the present invention. The circuit configuration of the switch-mode dc power supply according to the second embodiment is very similar to the configuration of the first embodiment, but the NOT gate 44 in the triangular wave generator 41 shown in FIG. 3B is eliminated. And a current mirror 43 of the second embodiment also has a first transistor Q2 and a second transistor Q3. The first transistor Q2 has a first emitter electrode, a first collector electrode connected to the detection circuit 18 and a first base electrode connected to the first collector electrode. The second transistor Q3 has a second emitter electrode connected to the first emitter electrode of the first transistor Q2, a second collector electrode connected to one end of a resistor Ra in a current detector 51, and a second base electrode connected to the first base electrode. And the one end of the resistor Ra is further connected to the plus-side input terminal of a comparator 50 through a NOT gate 59. Other circuit configuration is similar to the structure shown in FIG. 3B, and the overlapped description or the redundant description may be omitted in the second embodiment.

Figure 4B:
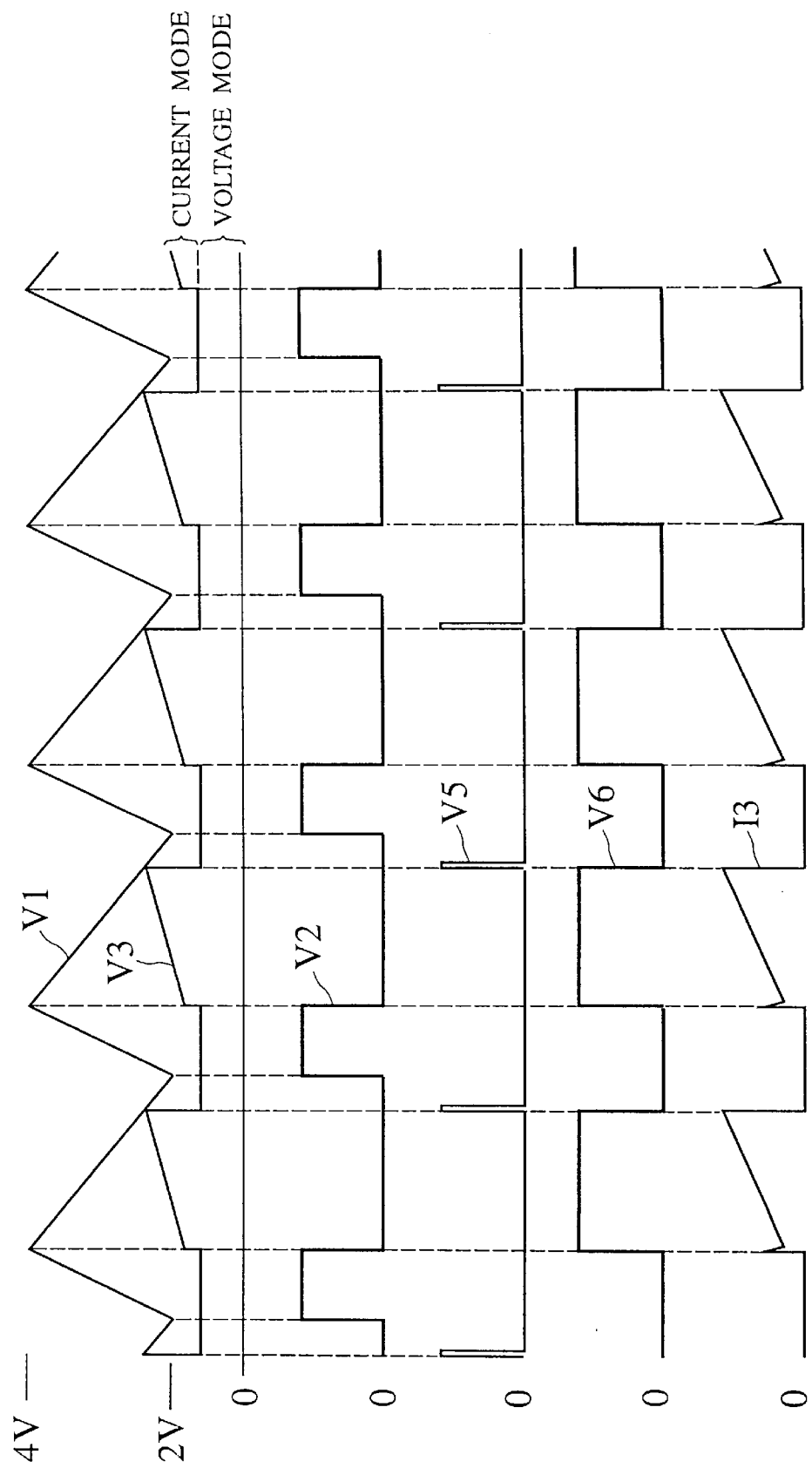
FIG. 4B is a timing chart explaining an operation of the switch-mode dc power supply according to the first embodiment with a heavy load.
Figure 6:
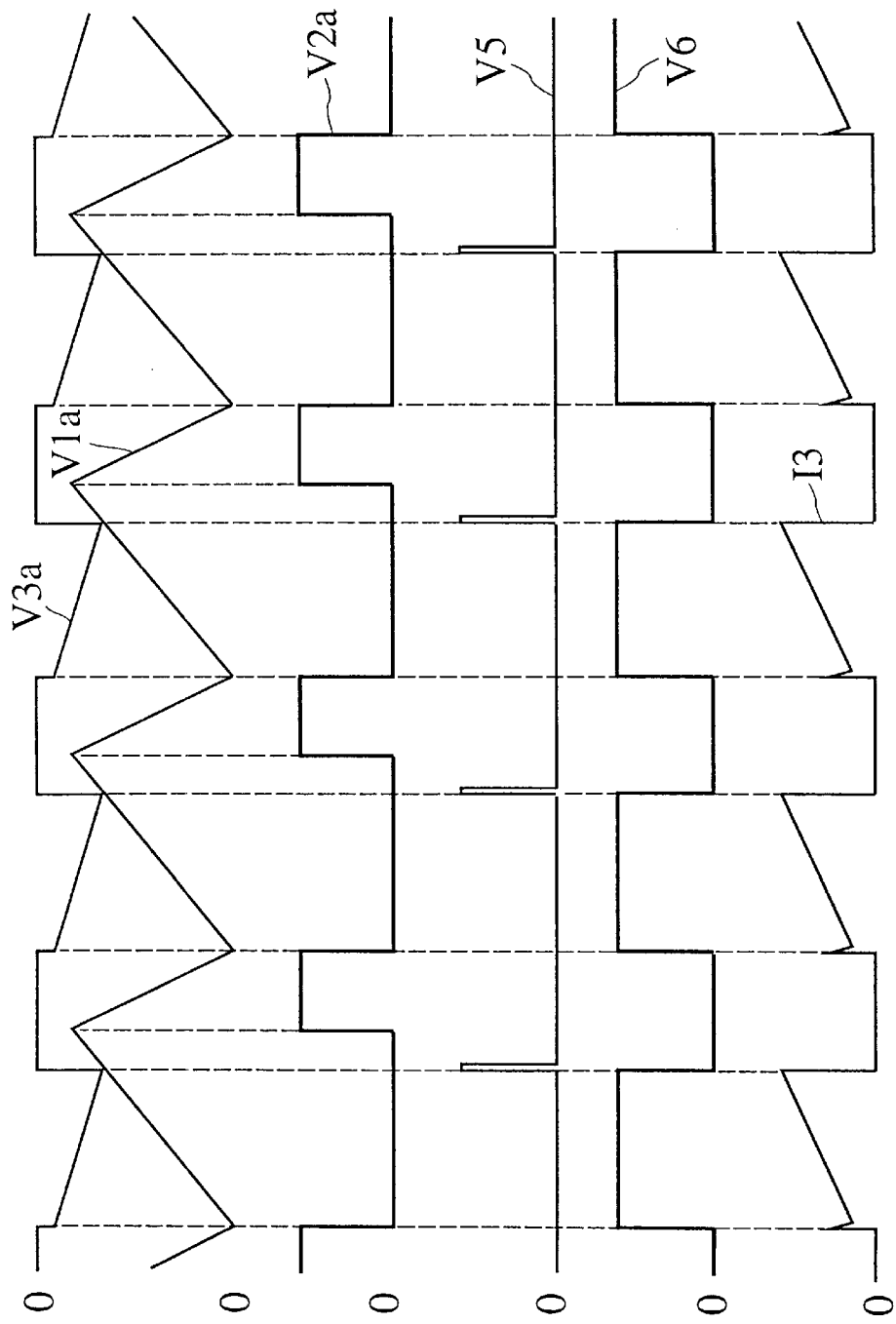
FIG. 6 is a timing chart explaining an operation of the switch-mode dc power supply according to the second embodiment of the present invention.

In the first embodiment, the triangular reference voltage V1 from the triangular wave generator 41 has the waveform shown in FIG. 4A and FIG. 4B. However, in a switch-mode dc power supply according to a second embodiment of the present invention, the triangular wave generator outputs the triangular reference voltage V1a and the rectangular synchronizing pulse signal V2a as shown in FIG. 6. Namely, the triangular reference voltage V1 shown in FIG. 4A and FIG. 4B is inverted. However, the instantaneous value of the triangular reference voltage V1a rises lineally with time from a lowest level to a highest level with a predetermined slope similar to the first embodiment. And similar to FIG. 4A and FIG. 4B, the instantaneous value of the triangular reference voltage V1a descends lineally with time from the highest level to the lowest level with another predetermined slope. And, the instantaneous value of the triangular reference voltage V1a repeats these risings and descendings to form the periodic triangular waveform.

The inverted rectangular synchronizing pulse signal V2a is obtained, since the NOT gate 44 in the configuration shown in FIG. 3B is eliminated. Here, the rectangular synchronizing pulse signal V2a is at "H" level between the descending period of the triangular reference voltage V1a, and at "L" level between the rising period of the triangular reference voltage V1a. And, the augmented voltage signal V3 is inverted by the NOT gate 59 to obtain an inverted augmented voltage signal V3a at the plus-side input terminal of the comparator 50 in the control signal generator 46 as shown in FIG. 5. And thereafter, the semiconductor switching element Q1 is turned on and off by the drive signal V6, after comparing the signal V3a with the inverted triangular wave synchronism signal V1a.

Next, the operation of the switch-mode dc power supply according to the second embodiment will be explained using FIGS. 5 and 6. FIG. 6 shows a timing chart explaining the operation of the switch-mode dc power supply with heavy load. The comparator 50 in the control signal generator 46 compares the augmented voltage signal V3a and the triangular reference voltage V1a. And when the potential level of the augmented voltage signal V3a drops below (reaches) the potential level of the triangular reference voltage V1a, the comparator 50 outputs an "H" level signal V5 to the R terminal of the flip-flop 24. That is, the pulse duration for the semiconductor switching element Q1 is determined by the period during which the triangular reference voltage V1a lies lower than the potential level of the augmented voltage signal V3a, in the upward slopes of the triangular waveforms.

Namely, the NOR gate 25 sends an inverted logical sum (NOR) of the signal output from the flip-flop 24 and the rectangular synchronizing pulse signal V2a to the driver 26. As shown in FIG. 6, when the driver 26 receives this signal from the NOR gate 25, the driver 26 sends to the gate electrode of the semiconductor switching element Q1 the drive signal V6. The drive signal V6 keeps the "H" level when the potential level of the augmented voltage signal V3a is larger than the potential level of the triangular reference voltage V1a. And the drive signal V6 turns to the "L" level when the potential level of the augmented voltage signal V3a decreased to reach the potential level of the triangular wave signals V1a. At this time, the output signal V5 is also outputted at the output terminal of the comparator 50. And the drive signal V6 is applied to the gate electrode of the semiconductor switching element Q1 so that the current I3 flows through the semiconductor switching element Q1.

That is, in the second embodiment, the driver 26 generates the inverted augmented voltage signal V3a, inverting the augmented voltage signal V3 in the first embodiment. And, when the potential level of the inverted augmented voltage signal V3a has decreased from the higher value to reach the potential level of the rising triangular reference voltage V1a, the output signal V5 is outputted at the output terminal of the comparator 50. The lowest value of the triangular reference voltage V1a is in synchronism with the trailing edge of the rectangular synchronizing pulse signal V2a. And in addition, the drive signal V6 keeps the "H" level for the period between the trailing edge of the rectangular synchronizing pulse signal V2a and the leading edge of the output signal V5, so as to define the duty ratio of the drive signal V6.

Therefore, with heavy load, by setting the impedance of the phototransistor Q6 into cut off state, a dc current corresponding to the dc voltage detected in the secondary side of the HF transformer 4 is not transmitted from the current mirror 43 to the resistor Ra. Then, the dc component in the augmented voltage signal V3 is reduced so that the time required for the inverted augmented voltage signal V3a to reach the inverted triangular reference voltage V1a increase so as to raise the peak value of the current I3 flowing through the semiconductor switching element Q1. Hence, when the load is heavy, the large current can be immediately obtained in the secondary side of the HF transformer 4. Consequently, by the second embodiment, in which the triangular wave generator inverts the triangular reference voltage V1 of the first embodiment to form the inverted triangular reference voltage V1a, the dc voltage at the secondary side of the HF transformer 4 is stabilised.

(Other Embodiments)

Various modifications will become possible for those skilled in the art after receiving the teaching of the present disclosure without departing from the scope thereof.

In the first and second embodiments described above, the dc current of the secondary winding side was detected using an optical coupler, but the same detection technique can be implemented in the primary winding or the auxiliary winding side.

Furthermore, instead of the power MOS FET, another semiconductor power device such as a power bipolar transistor (BJT), an insulated gate bipolar transistor (IGBT), or power static induction transistor (SIT) may be used as the semiconductor switching element Q1.

In the first and second embodiments, the resister R1 constitutes the current detection unit. However another active element such as a Sense MOS FET, or circuitry can be employed as the current detection unit connected to the semiconductor switching element Q1 so as to detect current flowing in the semiconductor switching element Q1.

Moreover, the buffer amplifier may comprise a low-pass filter using a capacitor C and a resistor R.

Thus, the present invention of course includes various embodiments and modifications and the like, which are not detailed above. Therefore, the scope of the present invention will be defined in the following claims.

What is claimed is:

1. A switch-mode dc power supply comprising:
   (a) a series circuit comprising a primary winding of a HF transformer, a semiconductor switching element and a current detection unit connected between two output terminals of a rectifier/smoothing circuit;
   (b) a rectifier, connected to a end of a secondary winding of said HF transformer;
   (c) an output smoothing circuit connected between said rectifier and other end of said HF transformer;
   (d) a detection circuit connected to a connection point between said rectifier and said output smoothing circuit;
   (e) an adding circuit connected between said detection circuit and a connection point between said semiconductor switching element and said current detection unit;
   (f) a triangular wave generator connected to said adding circuit; and
   (g) a control signal generator connected between said adding circuit and a control electrode of said semiconductor switching element, and further connected to said triangular wave generator.

2. The switch-mode dc power supply of claim 1, wherein said adding circuit comprises:
   a current mirror connected between said triangular wave generator and said control signal generator; and
   a current detector connected between said current mirror and said connection point between said semiconductor switching element and said current detection unit.

3. The switch-mode dc power supply of claim 2, wherein said current mirror comprises:
   a first transistor having a first emitter electrode, a first collector electrode connected to said detection circuit and a first base electrode connected to the first collector electrode; and
   a second transistor having a second emitter electrode connected to the first emitter electrode, a second collector electrode connected to said current detector and a second base electrode connected to the first base electrode.

4. The switch-mode dc power supply of claim 2, wherein said current detector comprises:

a resister connected between said current mirror and ground; and
   an amplifier connected between said current mirror and said connection point between said semiconductor switching element and said current detection unit.

5. The switch-mode dc power supply of claim 1, wherein said triangular wave generator has:
   a first output node for outputting a triangular reference voltage; and
   a second output node for outputting a rectangular synchronizing pulse signal, in synchronism with lowest and highest peaks of the triangular reference voltage.

6. The switch-mode dc power supply of claim 5, wherein said control signal generator comprises:
   a comparator having a input terminal connected to said adding circuit, another input terminal connected to said first output node of said triangular wave generator, and an output terminal;
   a flip-flop having a reset terminal connected to the output terminal of said comparator, a set terminal connected to said second output node of said triangular wave generator, and an output terminal;
   a logic gate having an input terminal connected to said second output node of said triangular wave generator, another input terminal connected to the output terminal of the flip-flop, and an output terminal; and
   a driver connected to the output terminal of the logic gate.

7. The switch-mode dc power supply of claim 1, wherein said detection circuit comprises:
   a differential amplifier having a input terminal for receiving a voltage output from said output smoothing circuit, and another input terminal for receiving a reference voltage, and an output terminal;
   an optical coupler connected to the output terminal of the differential amplifier having an output terminal for supplying a current to said adding circuit.

8. The switch-mode dc power supply of claim 5, wherein an instantaneous value of said triangular reference voltage rises lineally with time from a lowest level to a highest level with a predetermined slope, and descends lineally with time from the highest level to the lowest level with another predetermined slope, and repeats the rising and descending.

9. The switch-mode dc power supply of claim 8, wherein said rectangular synchronizing pulse signal is at "H" level between the rising period of said triangular reference voltage, and at "L" level between the descending period of said triangular reference voltage.

10. The switch-mode dc power supply of claim 8, wherein said rectangular synchronizing pulse signal is at "H" level between the descending period of said triangular reference voltage, and at "L" level between the rising period of said triangular reference voltage.

11. A monolithic integrated circuit for a switch-mode dc power supply, the integrated circuit comprising:
   (a) a semiconductor chip;
   (b) first, second and third input terminals, each comprising a thin metallic film, disposed at periphery of the semiconductor chip;
   (c) first and second output terminals, each comprising the thin metallic film, disposed at periphery of the semiconductor chip;
   (d) a regulator merged in a surface of the semiconductor chip, the regulator connected to the first input terminal;
   (e) an adding circuit merged in the surface of the semiconductor chip, the adding circuit connected to the regulator, the second and third input terminals;

(f) a triangular wave generator merged in the surface of the semiconductor chip, the triangular wave generator connected to said adding circuit; and (g) a control signal generator connected between the adding circuit and the first output terminal, and further connected to said triangular wave generator.

12. The integrated circuit of claim 11, wherein said adding circuit comprises:

a current mirror connected between said triangular wave generator and said control signal generator; and a current detector connected between said current mirror and said third input terminal.

13. The integrated circuit of claim 12, wherein said current mirror comprises:

a first transistor having a first emitter electrode, a first collector electrode connected to said second input terminal and a first base electrode connected to the first collector electrode; and a second transistor having a second emitter electrode connected to the first emitter electrode, a second collector electrode connected to said current detector and a second base electrode connected to the first base electrode.

14. A hybrid integrated circuit for a switch-mode dc power supply, the integrated circuit comprising:

(a) a conductive base substrate;

(b) an insulating plate disposed on a part of the conductive base substrate;

(c) a first semiconductor chip disposed on another part of the conductive base substrate, the first semiconductor chip merging a semiconductor switching element; and (d) a second semiconductor chip disposed on the insulating plate, the second semiconductor chip having an integrated circuit comprising:

a regulator merged in a surface of the second semiconductor chip;

an adding circuit merged in the surface of the second semiconductor chip, the adding circuit connected to the regulator;

a triangular wave generator merged in the surface of the second semiconductor chip, the triangular wave generator connected to said adding circuit; and a control signal generator connected to the adding circuit and to said triangular wave generator.

15. The integrated circuit of claim 14, wherein said first semiconductor chip further comprises:

a gate terminal disposed on a surface of the first semiconductor chip, the gate terminal comprising a thin metallic film; and a source terminal disposed on the surface of the first semiconductor chip, the source terminal comprising the thin metallic film.

16. The integrated circuit of claim 15, wherein said second semiconductor chip further comprises:

a first input terminal connected to the regulator, the first input terminal comprising the thin metallic film and is disposed at periphery of the second semiconductor chip;

a second input terminal connected to the adding circuit, the second input terminal comprising the thin metallic film and is disposed at periphery of the second semiconductor chip;

a third input terminal connected to the adding circuit, the third input terminal comprising the thin metallic film and is disposed at periphery of the second semiconductor chip;

a first output terminal connected to the control signal generator, the first output terminal comprising the thin metallic film and is disposed at periphery of the second semiconductor chip; and a second output terminal connected to the adding circuit, the second output terminal comprising the thin metallic film, disposed at periphery of the second semiconductor chip.

17. The integrated circuit of claim 16, further comprising:

first to fourth conductive leads disposed electrically isolated from the conductive base substrate;

a first bonding wire connecting the gate terminal to the first output terminal;

a second bonding wire connecting the source terminal to the first conductive lead;

a third bonding wire connecting the third input terminal to the first conductive lead;

a fourth bonding wire connecting the second output terminal to the second conductive lead;

a fifth bonding wire connecting the second input terminal to the third conductive lead; and a sixth bonding wire connecting the first input terminal to the fourth conductive lead.

18. The integrated circuit of claim 16, wherein said adding circuit comprises:

a current mirror connected between said triangular wave generator and said control signal generator; and a current detector connected between said current mirror and said third input terminal.

19. The integrated circuit of claim 18, wherein said current mirror comprises:

a first transistor having a first emitter electrode, a first collector electrode connected to said second input terminal and a first base electrode connected to the first collector electrode; and a second transistor having a second emitter electrode connected to the first emitter electrode, a second collector electrode connected to said current detector and a second base electrode connected to the first base electrode.

20. The integrated circuit of claim 18, wherein said current detector comprises:

a resister connected between said current mirror and ground; and an amplifier connected between said current mirror and said third input terminal.

* * * * *